United States Patent
Suzuki et al.

(10) Patent No.: US 6,902,186 B2
(45) Date of Patent: Jun. 7, 2005

(54) KNEE PROTECTING AIRBAG DEVICE

(75) Inventors: Kazumasa Suzuki, Aichi-ken (JP);
Masahiro Takimoto, Aichi-ken (JP);
Yoshio Mizuno, Aichi-ken (JP);
Atsushi Nagata, Aichi-ken (JP); Ryoji Kagohashi, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 164 days.

(21) Appl. No.: 10/339,743

(22) Filed: Jan. 10, 2003

(65) Prior Publication Data

US 2003/0132618 A1 Jul. 17, 2003

(30) Foreign Application Priority Data

Jan. 11, 2002 (JP) ........................ 2002-005179
Jan. 11, 2002 (JP) ........................ 2002-005192
Jun. 11, 2002 (JP) ........................ 2002-169876

(51) Int. Cl.⁷ ............................................. B60R 21/22
(52) U.S. Cl. ................. 280/730.1; 280/728.2
(58) Field of Search .............................. 280/730.1, 732, 280/731, 728.2, 728.3

(56) References Cited

U.S. PATENT DOCUMENTS

| | | | |
|---|---|---|---|
| 3,618,978 A | * 11/1971 | Klove et al. ............ | 280/730.1 |
| 5,482,313 A | 1/1996 | Ikeya et al. | |
| 5,564,732 A | * 10/1996 | Bauer et al. ............ | 280/728.3 |
| 5,582,424 A | * 12/1996 | Okuyama et al. ........ | 280/728.3 |
| 5,687,989 A | 11/1997 | Maesing et al. | |
| 5,851,023 A | 12/1998 | Nagata et al. | |
| 5,887,891 A | 3/1999 | Taguchi et al. | |
| 5,904,367 A | * 5/1999 | Warnez et al. .......... | 280/728.3 |
| 6,086,091 A | * 7/2000 | Heinz et al. ............ | 280/728.3 |
| 6,296,270 B1 | * 10/2001 | Amamori ................ | 280/728.2 |
| 6,302,437 B1 | * 10/2001 | Marriott et al. ......... | 280/732 |
| 6,431,585 B1 | * 8/2002 | Rickabus et al. ....... | 280/728.3 |
| 6,443,484 B2 | * 9/2002 | Anglsperger ........... | 280/728.3 |

FOREIGN PATENT DOCUMENTS

| | | |
|---|---|---|
| EP | 0 738 630 A1 | 10/1996 |
| EP | 0 739 788 A1 | 10/1996 |
| JP | 10-315894 | 12/1998 |
| JP | A-2001-130361 | 5/2001 |
| WO | WO 02/04261 A1 | 1/2002 |

* cited by examiner

*Primary Examiner*—David R. Dunn
(74) *Attorney, Agent, or Firm*—Posz Law Group, PLC

(57) ABSTRACT

A knee protecting airbag device comprises an airbag, an inflator, a case and an airbag cover to be assembled with the case. The case houses the airbag and the inflator, and is fixed to the side of the vehicular body with its rear side open. The airbag cover includes a door and a general portion around the door. The door closes the opening of the case and opens when the airbag expands and inflates. The general portion is surrounded by interior members of the vehicle when mounted on the vehicle. The knee protecting airbag device is mounted on the vehicle in an assembled state in which the airbag, the inflator and the airbag cover are joined to the case. The airbag cover is joined to the case in a movable manner so as to absorb the dimensional inconsistency between itself and the surrounding interior members.

7 Claims, 25 Drawing Sheets

KNEE PROTECTING AIRBAG DEVICE

The present application claims priority to Japanese patent application of Suzuki et al., filed Jan. 11, 2002, No. 2002-005179, Japanese patent application of Suzuki et al., filed Jan. 11, 2002, No. 2002-005192, and Japanese patent application of Takimoto, filed Jun. 11, 2002, No. 2002-169876, the entirety of each is hereby incorporated into the present application by this reference.

BACKGROUND OF THE INVENTION

1. Field of the Invention

The present invention relates to a knee protecting airbag device in which an airbag to be expanded and inflated with an inflating gas let in protects the knee of an occupant such as a driver and a front seat passenger.

2. Description of Related Art

As disclosed in Japanese Patent Laid-Open No. Hei 10-315894, the device for protecting the knee of an occupant in the prior art has a case, which houses a folded airbag and an inflator for feeding the airbag with inflation gas, at the lower side of the column cover below the steering column. The opening of the case is closed by an airbag cover. In an airbag device of this kind, there are arranged interior members such as a lower panel of an instrument panel (as will be called "dashboard" hereinafter) around the airbag cover.

Considering the mounting workability of the airbag device on a vehicle, the airbag cover is prepared separately from these interior members. The airbag cover is attached to the case together with the airbag and the inflator to form an airbag assembly. It is desired to mount this airbag assembly on a vehicle utilizing a predetermined portion of the case, from the viewpoint of mounting workability.

When the case is fixed to a predetermined position of the vehicle, however, there may arise an assembling error such as dimensional inconsistency between the airbag cover and the interior members. In this case, an adequate appearance and design cannot be presented because of steps or gaps between the airbag cover and the interior members.

Therefore, it is desired that an airbag assembly is mounted on a vehicle while preventing the assembling error between the airbag cover and the interior members.

On the other hand, another knee protecting airbag device in the prior art has a generally square-plate-shaped door which opens upward turning the lower end thereof upward, as a door to be pushed and opened by an inflating airbag (refer to International Publication No. WO 02/04261 A1).

In the upward-opening door of this kind, it is likely that one of the left and right side edges approaches the occupant whereas the other is apart from the occupant because of the circumferential design. In this case, the leading end of the opened door (or the lower end, before opening) may push the side of the vehicular side wall being a part of the completely inflated airbag toward the vehicle's rear side.

Especially, the upward-opening door largely moves upward by the intense force of the inflating airbag at the initial time of opening. However, the upward-opening door sometimes returns to close right before the completion of the inflation of the airbag. Then, the leading end of the upward-opening door pushes the vehicular side wall of the airbag rearward.

At this time, the following problem may arise if the distance between the upward-opening door and an occupant, before opening, is different at one of the left and right side edge and at the other because of the circumferential design.

Specifically, when the upward-opening door pushes the airbag rearward, the leading end of the side edge of the door closer to the occupant pushes the airbag even closer to the occupant, even if the airbag itself is so mounted on the case as to confront head-on the occupant. Accordingly, the expanded and inflated airbag is twisted, instead of confronting head-on the occupant.

As a result, the expanded and inflated airbag does not contact the advancing knee of the occupant properly.

Therefore, it is desired that the expanded and inflated airbag be made confront head-on the occupant in case the knee protecting airbag device has an upward-opening door in which the distances in the longitudinal direction to the occupant are different at the left and right side edges thereof.

In an airbag device of this kind, moreover, an airbag assembly desirably is formed in advance of individual parts and is mounted on a vehicle for facilitating the mounting work.

In this case, the general portion in the airbag cover around the door is surrounded by vehicle's interior members. If this general portion is made greater in its contour, it blocks the fixing work of the case to the body by means of bolts and so on. Accordingly, the fixing work including fastening bolts is made using a mounting hole opened on the general portion. Moreover, a cap for closing the mounting hole is needed so as not to deteriorate the design of the airbag cover after the fixing work.

However, the airbag cover of this kind is so constructed to open by the push of an expanding and inflating airbag, as to protrude the airbag from the opening thereof. That is, the airbag cover receives a rapid pressure from the airbag when the airbag device is activated. Accordingly, the cap has to be attached on the airbag cover so as not to be blown off.

Of course, the cap has to be easily attached on the airbag cover for closing the mounting hole, too.

SUMMARY OF THE INVENTION

A first object of the present invention is to provide a knee protecting airbag device which mounts an integrated airbag assembly on a vehicle while suppressing the assembling error such as dimensional inconsistency between the airbag cover and the interior parts.

A second object of the invention is to provide a knee protecting airbag device which has the expanded and inflated airbag confront head-on an occupant even if it is provided with an upward openable door having different distances to the occupant in the vehicular longitudinal direction at its two lefthand and righthand side edges.

A third object of the invention is to provide a knee protecting airbag device which prevents a simply mountable cap from being blown off at the acting time of the device even if the mounting hole for fixing the airbag assembly in the airbag cover on the body is closed with the cap.

A knee protecting airbag device according to the first aspect of the invention is arranged in front of the knees of a seated occupant. The knee protecting airbag device comprises: a knee protecting airbag folded; an inflator for feeding the airbag with an inflating gas; a case; and an airbag cover to be assembled with the case. The case houses the airbag and the inflator and is opened at the vehicular rear side and mounted and fixed on the body side of the vehicle. The airbag cover is provided with a door and a general portion. The door covers the opening of the case and is opened when the airbag is expanded and opened. The general portion is arranged around the door and is covered therearound with an interior member of the vehicle when mounted on the vehicle. In the knee protecting airbag device, the airbag, the inflator and the airbag cover are assembled with the case to form an airbag assembly, and this airbag assembly is mounted on the vehicle. The airbag cover is assembled so movably with the case as to absorb an assembly error such as dimensional inconsistency with respect to the interior member arranged therearound.

In the knee protecting airbag device according to the first aspect of the invention, even if an assembling error arises between the airbag cover and the interior parts arranged therearound, when the airbag assembly is mounted on the vehicle, the airbag cover absorbs the assembling error when the integrated airbag assembly is attached and fixed on the vehicle. In other words, the airbag cover moves relative to the interior parts arranged therearound so as not to cause dimensional disorder between the interior parts and the general portion.

Therefore, the knee protecting airbag device of the first aspect of the invention mounts the integrated airbag assembly on the vehicle while suppressing the assembling error between the airbag cover and the interior parts, and improves the appearance design in the interior parts such as a dashboard and the airbag cover.

This knee protecting airbag device of the first aspect may be constructed in the following manner. The case includes a peripheral wall portion and assembling members. The peripheral wall portion is opened at the rear end side while enclosing the airbag and the inflator housed therein. The assembling members are arranged on the outer surface of the peripheral wall portion and are assembled with the airbag cover. The airbag cover includes assembling pieces and assembling holes. The assembling pieces protrude toward the vehicular front side from the general portion and are arranged adjacent to the portions of the peripheral wall portion of the case, in which the assembling members are arranged. The assembling holes are bored through the assembling piece at positions corresponding to the assembling members. Moreover, the assembling members include retaining frames and come-out stoppers. The retaining frames penetrate the assembling holes for retaining the assembling piece. The come-out stoppers are to be arranged at such portions in the retaining frames as to protrude from the assembling holes to the outer surface side of the assembling piece, and retain the peripheral edges of the assembling holes formed on the outer surface sides of the assembling piece.

With this construction, the retaining frames of the assembling member arranged in the case peripheral wall portion are inserted into the assembling holes formed on the assembling piece of the airbag cover, and the come-out stoppers are retained on the assembling hole peripheral edges, so that the airbag cover can be assembled into the case. Therefore, the assembling work of the airbag cover with the case is facilitated. Merely by providing the assembling members on the case peripheral wall portion and by arranging the assembling pieces having the assembling holes on the airbag cover, the airbag cover is assembled with the case while absorbing an assembling error with the interior parts. Thus, the assembling structure is simplified.

With the aforementioned construction of the knee protecting airbag device, moreover, the assembling members are individually arranged on the opposed wall portions in the case peripheral wall portion. Moreover, the come-out stopper of the assembling member arranged on at least one wall portion is formed to include a bent portion and a locking bar. The bent portion is bent and formed integrally with the retaining frame at the portion, as protruding from the assembling hole to the outer surface side of the assembling member, in the retaining frame. The locking bar is made separate from the bent portion and is so arranged and fixed between the bent portion and the assembling piece as to prevent the bent portion from coming out of the assembling hole.

With this construction, the come-out stopper of the assembling member arranged on at least one wall portion in the case peripheral wall portion is reliably prevented by the locking bar from coming out of the assembling hole of the bent portion. Therefore, the assembling piece of the airbag cover is firmly assembled with the case.

With the aforementioned construction of the assembling members, moreover, the door of the airbag cover may be constructed in the following manner. Specifically, the door includes: a hinge portion arranged at a part of its peripheral edge for the door portion to open on; and a breakage-expected portion arranged in the portion of the peripheral edge excepting the hinge portion and to be broken when pushed by the airbag. Moreover, the assembling member including the locking bar is provided in the peripheral wall portion of the case positioned on the leading end side of the door apart from the hinge portion.

With this construction, the assembling member for assembling the assembling piece firmly is arranged on the peripheral wall portion of the case, as positioned on the leading end side of the door apart from the hinge. When the airbag protrudes, therefore, the leading end side of the door is hardly moved largely relative to the case with the firm assembly even if pushed by the airbag. Therefore, the pushing force of the airbag acts easily on the breakage-expected portion arranged on the leading end side of the door. As a result, the breakage-expected portion arranged on the leading end side of the door is smoothly and properly broken so that the remaining breakage-expected portion may be promptly broken. In short, the door is smoothly opened to expand and inflate the airbag promptly.

In case the assembling members are individually arranged on the opposed wall portions in the case peripheral wall portion, the assembling member arranged on at least one wall portion may be constructed in the following manner. Specifically, this assembling member includes a fixing portion and a bent portion. The fixing portion is arranged on the end portion side in the come-out stopper apart from the retaining frame and can be fixed on the case peripheral wall portion. The bent portion is arranged at the end portion in the retaining frame on the side of the case peripheral wall portion and is so formed and bent from the retaining frame as to be retained on the assembling hole peripheral edge. Moreover, the assembling piece is assembled with the assembling member by inserting the retaining frame into the assembling hole, retaining the bent portion on the assembling hole peripheral edge, and by fixing the fixing portion on the case peripheral wall portion.

With this construction, when the assembling piece of the airbag cover is to be assembled with the case, the bent portion is retained on the assembling hole peripheral edge so that the assembling piece is clamped between the come-out stopper and the bent portion, and the fixing portion is used to fix the assembling member on the case peripheral wall portion. Therefore, the coming-out of the retaining frame from the assembling hole is reliably prevented to assemble the assembling piece of the airbag cover firmly.

With the aforementioned construction of the assembling members, too, the door of the airbag cover is desirably constructed such that the hinge portion to be the center of rotation when the door is opened is arranged at a part of the peripheral edge thereof, and such that the breakage-expected portion to be broken by the push of the airbag is arranged at the portion of the peripheral edge excepting the hinge portion. The assembling member to include a bent portion is arranged on the peripheral wall portion of the case positioned on the leading end side of the door apart from the hinge portion.

With this construction, the assembling member for assembling the assembling piece firmly is arranged on the peripheral wall portion of the case, as positioned on the leading end side of the door apart from the hinge. When the airbag protrudes, therefore, the leading end side of the door is hardly moved largely relative to the case even if it is pushed by the airbag. Therefore, the pushing force of the airbag acts easily on the breakage-expected portion arranged on the leading end side of the door, so that the breakage-expected portion arranged on the leading end side of the door is broken smoothly and properly, and the remaining breakage-expected portion is also promptly broken. In short, the door is smoothly opened so that the airbag may be promptly expanded and inflated.

A knee protecting airbag device according to the second aspect of the invention comprises: a folded airbag; a case for housing the airbag; and an airbag cover for covering the vehicular rear side of the airbag housed. The airbag is constructed to be so expanded and inflated that it may push and open the airbag cover, when an inflating gas is fed to the inside of the airbag, to protrude toward the vehicular rear side from an opening of the case on the vehicular rear side, so as to protect the knees of an occupant. The airbag cover includes an upward openable door adapted to be so opened by turning the lower end side upward as to form an opening for protruding the airbag. The lefthand and righthand side edges of the upward openable door are so arranged that one may be arranged closer to the occupant in the longitudinal direction of the vehicle whereas the other may be apart from the occupant. The upward openable door is so arranged that one of the lefthand and righthand side edges closer to the occupant has a shorter length whereas the other of the lefthand and righthand side edges apart from the occupant has a longer length. The leading end of the door opened and arranged generally in the horizontal direction extends in the transverse direction of the vehicle.

When the knee protecting airbag device according to the second aspect of the invention acts, the upward openable door is opened by the push of the airbag being inflated, by turning the leading end upward, and descends the leading end generally toward the horizontal direction thereafter. At this time, the upward openable door is so set that one of the lefthand and righthand side edges closer to the occupant has a shorter length whereas the other edge apart from the occupant has a longer length. Therefore, the upward openable door arranges its leading end in the transverse direction of the vehicle. As a result, the airbag confronts head-on the occupant without being twisted, even if pushed by the leading end of the upward openable door.

In the knee protecting airbag device according to the second aspect of the invention, therefore, the airbag expanded and inflated easily confronts head-on the occupant even if the device is provided with an upward openable door having different distances to the occupant in the vehicular longitudinal direction at its two lefthand and righthand side edges. Moreover, the airbag device can protect the knees of the occupant coming forward, properly with its airbag.

Moreover, below the upward openable door is arranged a downward openable door to be opened by turning its upper end side downward with its upper end adjoining the lower end of the upward openable door, and a breakage-expected portion to be broken by the push of the airbag being expanded and inflated, so as to open the upward openable door and the downward openable door is arranged generally in an H-shape, as viewed from the vehicular rear side, around the upward openable door and the downward openable door. In this case, the construction is made in the following manner. Specifically, the H-shaped lefthand and righthand vertical lines of the breakage-expected portion oppose each other transversely, and the H-shaped transverse line of the breakage-expected portion is vertically inclined with respect to the transverse direction of the vehicle.

With this construction, when the breakage-expected portion is broken by the push of the airbag being inflated, the upward openable door and the downward openable door are opened to form a rectangular opening. At this time, as compared with the case in which an opening of the same area is opened by arranging one upward openable door, the opening for protruding the airbag can be formed more quickly by the split doors. As a result, the airbag is promptly expanded and inflated.

Of course, in the upward openable door, the H-shaped transverse line of the breakage-expected portion is vertically inclined with respect to the transverse direction of the vehicle so that one of the lefthand and righthand side edges on the side close to the occupant may have a shorter length whereas the other of the lefthand and righthand side edges on the side apart from the occupant may have a longer length. Therefore, the leading end of the upward openable door opened can be arranged in the transverse direction of the vehicle. As a result, the airbag confronts head-on the occupant without being twisted, even if pushed by the leading end of the upward openable door.

In the downward openable door, contrary to the upward openable door, moreover, one of the lefthand and righthand side edges on the side close to the occupant may have a longer length whereas the other of the lefthand and righthand side edges on the side apart from the occupant may have a shorter length. In other words, if the downward openable door is arranged generally in the horizontal direction, the leading end on the side of the longer side edge can push up the occupant's side wall portion in the airbag. Therefore, the airbag protruded from the opening formed between the upward openable door and the downward opening door is pushed up near the edge close to the occupant by the leading end of the longer side edge of the downward openable door. As a result, the airbag having completed its inflation confronts head-on the occupant while suppressing the twisting of the airbag.

Moreover, the downward openable door to be opened by turning its upper end side downward is arranged below the upward openable door with its upper end adjoining the lower end of the upward openable door, and the breakage-expected portion to be broken by the push of the airbag being expanded and inflated, so as to open the upward openable door and the downward openable door is arranged generally in an H-shape, as viewed from the vehicular rear side, around the upward openable door and the downward openable door. In this case, the construction may be made in the following manner, too. Specifically, the H-shaped lefthand and righthand vertical lines of the breakage-expected portion oppose each other transversely, and the H-shaped transverse line of the breakage-expected portion is arranged generally in the horizontal direction. Moreover, the upward openable door and the downward openable door are generally vertically symmetric with respect to the transverse line portion.

With this construction, too, the opening for protruding the airbag can be formed more quickly in the airbag cover than by a single door. Moreover, the leading end of the upward openable door opened can be arranged in the transverse direction of the vehicle. When the opened downward openable door is arranged generally in the horizontal direction, moreover, its leading end can also be arranged in the transverse direction of the vehicle like the leading end of the upward openable door.

A knee protecting airbag device according to the third aspect of the invention comprises an airbag, an inflator, an airbag cover and a case. The airbag is housed in a folded shape for being expanded and inflated to protect the knees of an occupant. The inflator feeds the airbag with an inflating gas. The airbag cover includes a door covering the folded airbag and capable of being opened to protrude the airbag being expanded and inflated, and a general portion around the door. The case is fixed on the body side of the vehicle for housing and holding the airbag and the inflator and for holding the airbag cover. The airbag cover includes a mounting hole formed in the general portion to be used when the case is to be fixed on the body. The airbag cover also has a cap for closing the mounting hole in the general portion. The cap is provided with retaining pawls to be retained on the mounting hole peripheral edge and is mounted on the airbag cover by a connection means to be connected unremovably. Moreover, an airbag assembly is formed by assembling the airbag, the inflator and the airbag cover with the case. The airbag assembly is mounted on the vehicle by fixing the case on the body by means of the mounting hole.

In the knee protecting airbag device according to the third aspect of the invention, when the mounting hole used for fixing the case of the airbag assembly on the body of the vehicle is closed, the cap can be simply mounted on the airbag cover by connecting the connection means to the airbag cover and by retaining the retaining pawls on the mounting hole peripheral edge.

Especially, the cap is mounted on the airbag cover by using the connection means and the retaining pawls. In other words, the connection means does not have to be provided on the whole peripheral edge of the cap, but has only to be arranged at a part of the cap peripheral edge, and the retaining pawls may be provided on the other portions. Moreover, the retaining pawls can be retained on the mounting hole peripheral edge by the pushing the cap thereinto. Therefore, the cap of the invention does not invite the reduction in the mounting workability as compared with a cap which is mounted only by a plurality of retaining pawls.

The connection means is unremovably connected to the airbag cover. At the acting time of the airbag device, therefore, the cap is prevented from coming out of the airbag cover by the connection means, even if the retaining pawls come out of the mounting hole peripheral edge, so that the cap is prevented from becoming blown off from the airbag cover.

In the knee protecting airbag device according to the third aspect of the invention, therefore, the cap is prevented from becoming scattered while the device is acting, even if the mounting hole in the airbag cover for fixing the airbag assembly on the body is closed with a cap which can be mounted simply and conveniently.

Moreover, it is desired that the connection means is inserted into the connection hole arranged in the peripheral edge of the mounting hole and is connected to the airbag cover unremovably from the connection hole.

In the case of this construction, the connecting work of the connection means of the cap to the airbag cover can be done by forming the connection hole in the mounting hole peripheral edge and by inserting the connection means into the connection hole. In short, the connection means can be connected simply and conveniently to the airbag cover without using any new parts.

It is also desired that the connection means is movably connected to the airbag cover, and that the retaining pawls are retained on the mounting hole peripheral edge after the connecting means was connected to the airbag cover.

With this construction, the connection means is movable relative to the airbag cover even if the connection means of the cap is connected to the airbag cover. After the connection means was connected to the airbag cover, therefore, the retaining pawls can be easily retained on the mounting hole peripheral edge while moving the cap. With this construction, more specifically, the mounting hole can be opened in advance with the connection means of the cap being connected to the airbag cover, before the airbag assembly is mounted on the vehicle. After the case was fixed on the body, moreover, the mounting hole can be instantly closed merely by moving the cap. Therefore, the mounting hole can be simply closed with the cap without inviting any loss of the cap, after the case was fixed on the body.

Moreover, the connection means is formed of a connection band having such flexibility as may be inserted into the connection hole. This connection band is connected to the airbag cover by inserting the retaining head portion arranged on its leading end side into the connection hole and further into retaining hole arranged on the root side of the connection band, thereby to retain itself on the retaining hole peripheral edge.

In the case of this construction, the connection band as the connection means can be mounted on the airbag cover by inserting the retaining head portion of the connection band into the connection hole and further into the retaining hole in the root side of the connection band thereby to retain the head portion on the peripheral edge of the retaining hole. This mounting work can be done from the outer side of the general portion so that the connecting work of the connection band can be facilitated. In the connected state, moreover, the connection band is mounted on the airbag cover while binding the peripheral edge of the connection hole. Therefore, the force to disengage the cap acts less in the direction for the retaining head portion to come out of the retaining hole than the case in which the connection means is directly inserted into the connection hole to be retained on the peripheral edge of the connection hole. As a result, the cap can be firmly mounted on the airbag cover.

Moreover, the cap is arranged at a position which is covered with the airbag having completed its expansion and inflation. It is desired that the connection means is arranged on the door side at the cap peripheral edge.

With this construction, the cap is arranged at a position which is covered with the airbag having completed its expansion and inflation, but the connection means is arranged on the door side of the cap peripheral edge. Therefore, even if the retaining pawls come out of the mounting hole peripheral edge and are far from the general portion of the airbag cover, the door side of the cap peripheral edge does not come off and far from the general portion of the airbag cover by the connection means. While the airbag is being expanded and inflated, the retaining pawls of the cap are hidden by the body of the cap so that the airbag completes its inflation smoothly without any hindrance by the retaining pawls.

DESCRIPTION OF THE PREFERRED EMBODIMENTS

Figure 1:
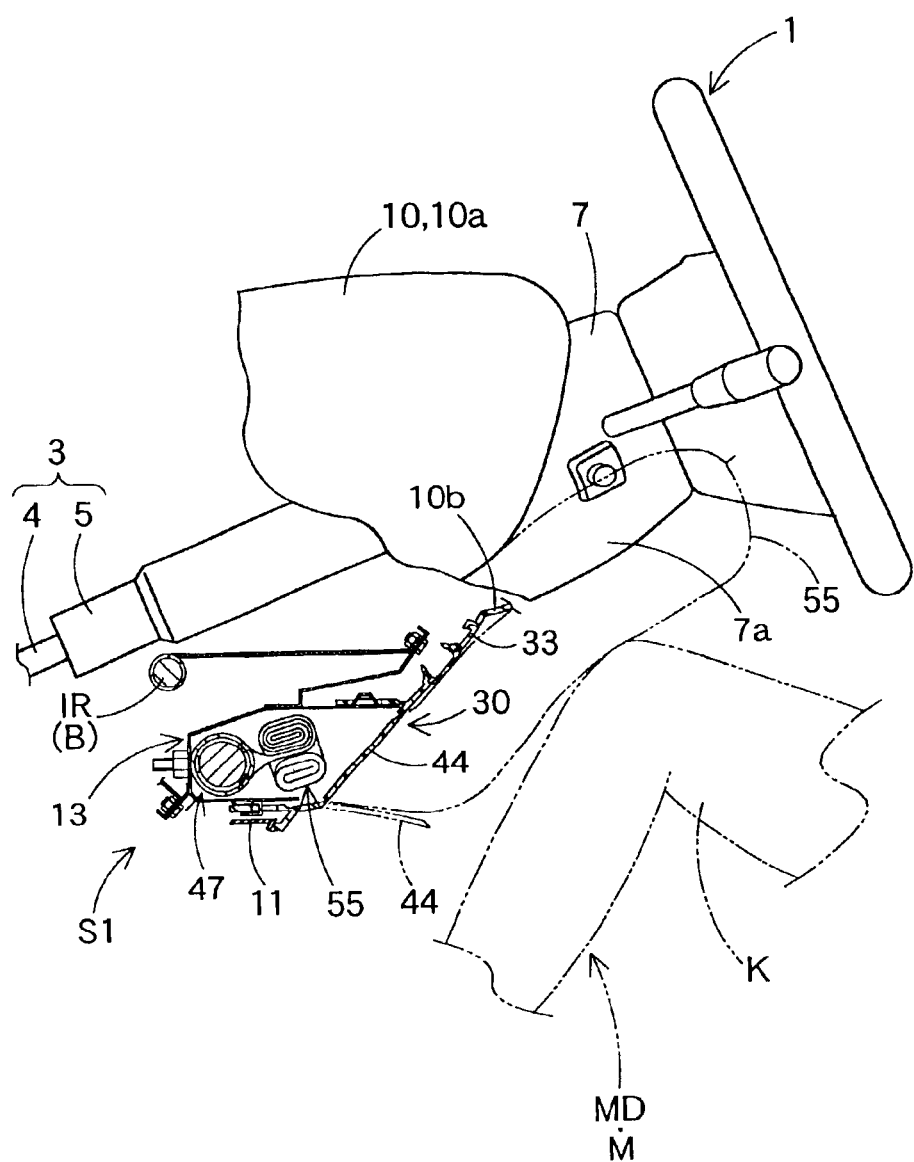
FIG. 1 is a schematic sectional view in the vehicle's longitudinal direction showing a knee protecting airbag device of a first embodiment of the present invention being deployed, and is a schematic section taken along line I—I of FIG. 5.

The invention will be described below by way of embodiments shown in the drawings. In addition, the invention is not limited to the embodiments. All modifications within the requirements of the claims and equivalents with respect to the requirements should be included in the scope of the claims.

Figure 2:
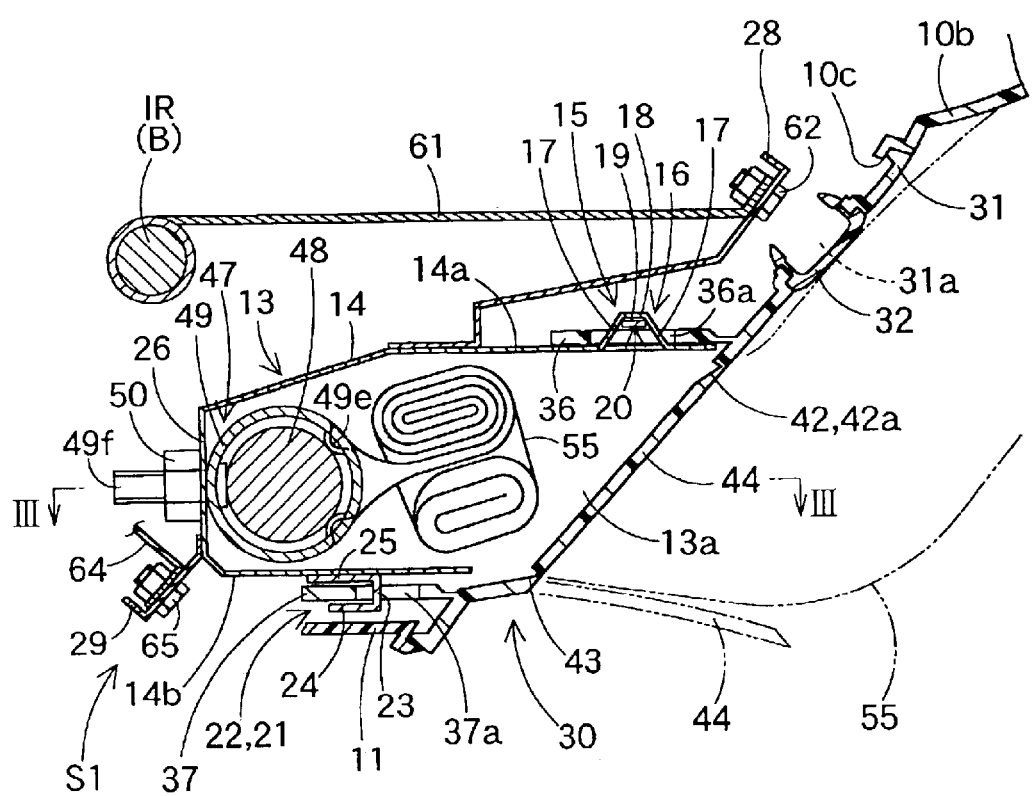
FIG. 2 is a schematic enlarged section in the vehicle's longitudinal direction of the knee protecting airbag device of the first embodiment.
Figure 3:
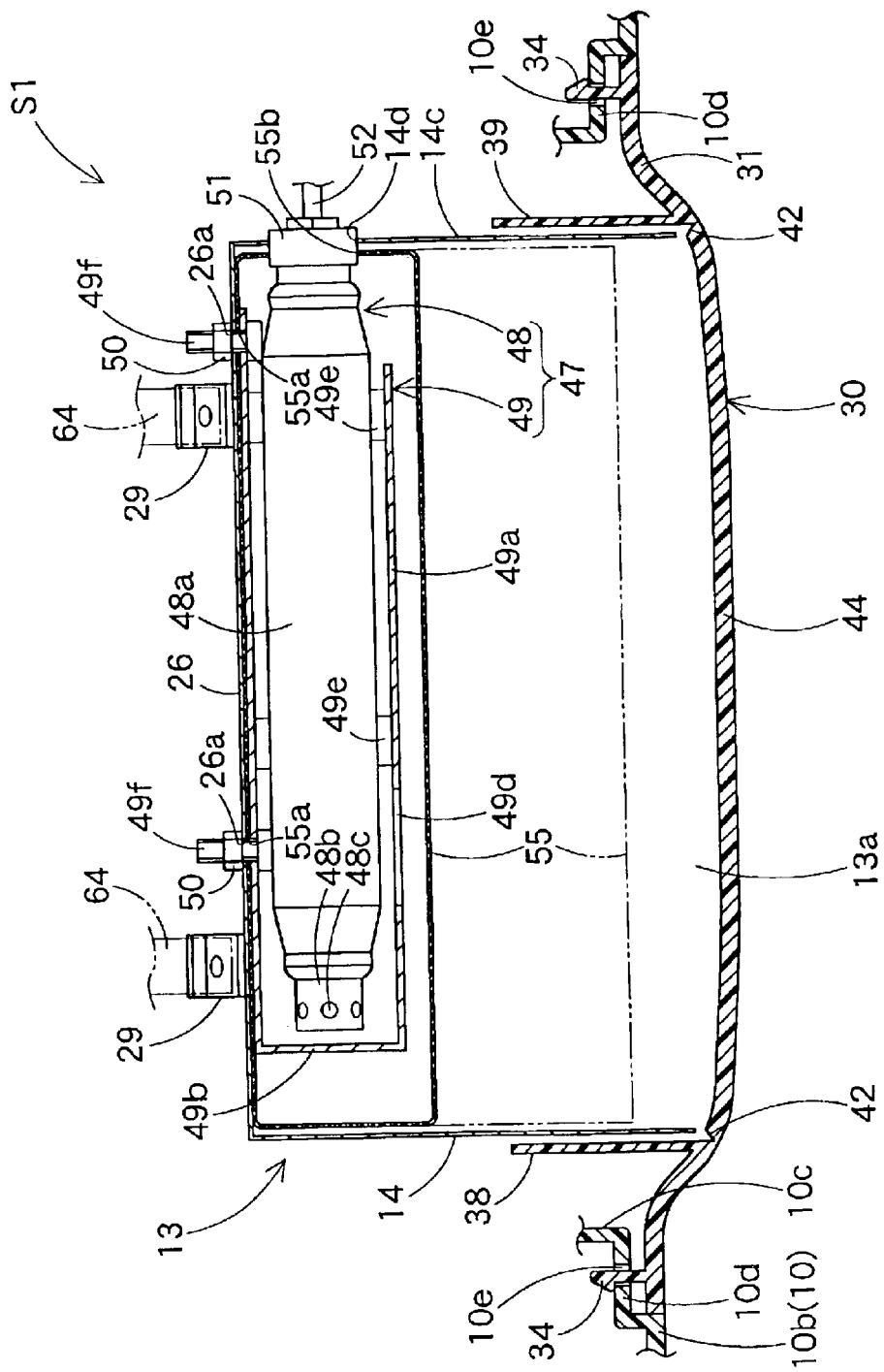
FIG. 3 is a sectional view taken along line III—III of FIG. 2.

As shown in FIGS. 1 to 3, a knee protecting airbag device S1 according to a first embodiment is so arranged under a steering column 3 on the vehicular front side of a driver MD or an occupant M as to protect the knees K (KL and KR) of the driver MD.

Here, the vertical, transverse and longitudinal directions in this Specification correspond to the vertical, transverse and longitudinal directions of the vehicle at the time when the knee protecting airbag device S1 is mounted on the vehicle.

The steering column 3 is constructed, as shown in FIG. 1, to include a main shaft 4 connected to a steering wheel 1, and a column tube 5 covering the main shaft 4. Between the main shaft 4 and the column tube 5, there are arranged a not-shown tilt mechanism to adjust the angle of the ring face of the steering wheel 1, a not-shown telescopic mechanism to move and stop the steering wheel 1 in the axial direction of the shaft 4, and so on.

A column cover 7 is formed of a synthetic resin into a generally square cylinder shape or the like and is so arranged in the axial direction of the steering column 3 as to cover the steering column 3 below the steering wheel. Specifically, the column cover 7 ascends backward to arrange its vehicular front side downward and its vehicular rear side upward. Moreover, the portion, as protruding from a dashboard 10, of the column cover 7 has a lower face 7a formed into a generally rectangular shape and curved to ascend backward in the vehicular longitudinal direction.

The knee protecting airbag device S1 is provided with: a folded airbag 55; an inflator 47 for feeding the airbag 55 with an inflating gas; a case 13 housing the folded airbag 55 and the inflator 47 and opened at its vehicular rear side; and an airbag cover 30 for covering the vehicular rear side of the case 13. In the airbag device S1, the airbag 55, the inflator 47 and the airbag cover 30 are assembled with the case 13 to form an integrated airbag assembly SA, and this airbag assembly SA is mounted on the body B of the vehicle.

As shown in FIGS. 1 to 4, the case 13 is made of a sheet metal and arranged on the lower side of the steering column 3. The case 13 is provided with a peripheral wall portion 14 of a generally rectangular cylinder shape covering the airbag 55 and the inflator 47 housed and opened at its rear end side, and a bottom wall portion 26 closing the vehicular front side of the peripheral wall portion 14. Moreover, assembling members 15 and 21 are arranged on the outer surface sides of the vertically opposed wall portions 14a and 14b of the peripheral wall portion 14 of the case 13.

The assembling member 15 arranged on the outer surface side of the wall portion 14a on the upper side is composed of a plurality of (e.g., six in the embodiment) projections 16 formed to have a generally inverted U-shaped section and juxtaposed in the vehicular transverse -direction, and one elongated locking bar 19 made separate from the projections 16 and arranged in the vehicular transverse direction. Each projection 16 is provided with two retaining frames 17 and 17 juxtaposed in the vehicular longitudinal direction, and a bent portion 18 which is bent from the retaining frames 17 and is formed so integrally with the retaining frames 17 as to connect the upper ends of the retaining frames 17 to each other. This projection 16 is formed by cutting and raising a predetermined portion of the wall portion 14a and is so opened transversely of the vehicle as to insert the locking bar 19 therethrough. Moreover, the retaining frames 17 and 17 can be inserted into assembling holes 36a, which are formed in an upper wall portion 36 acting as an assembling piece in the airbag cover 30. The bent portion 18 is so protruded from the outer surface side of the upper wall portion 36 as to insert the locking bar 19 into the clearance between the bent portion 18 and the upper wall portion 36 when the retaining frames 17 and 17 are inserted into the assembling holes 36a. By inserting the projections 16 into the assembling holes 36a and by inserting the locking bar 19 into the clearances between the upper wall portion 36 and the bent portions 18 protruded on the outer surface side of the upper wall portion 36, moreover, the upper wall portion (or the assembling piece) 36 of the airbag cover 30 is assembled with the assembling member 15. In the embodiment, more specifically, the come-out stoppers 20 are constructed of the bent portions 18 made integral with the retaining frames 17 of the projections 16, and the locking bar 19 made separate from the projections 16. The come-out stoppers 20 are protruded on the outer surface side of the upper wall portion 36 to retain the peripheral edge of the assembling holes 36a in the outer surface side of the upperwall portion 36. And, the bent portions 18 are prevented from coming out of the assembling holes 36a by the locking bar 19 to be inserted into the clearances between the bent portions 18 and the upper wall portion 36.

Figure 4:
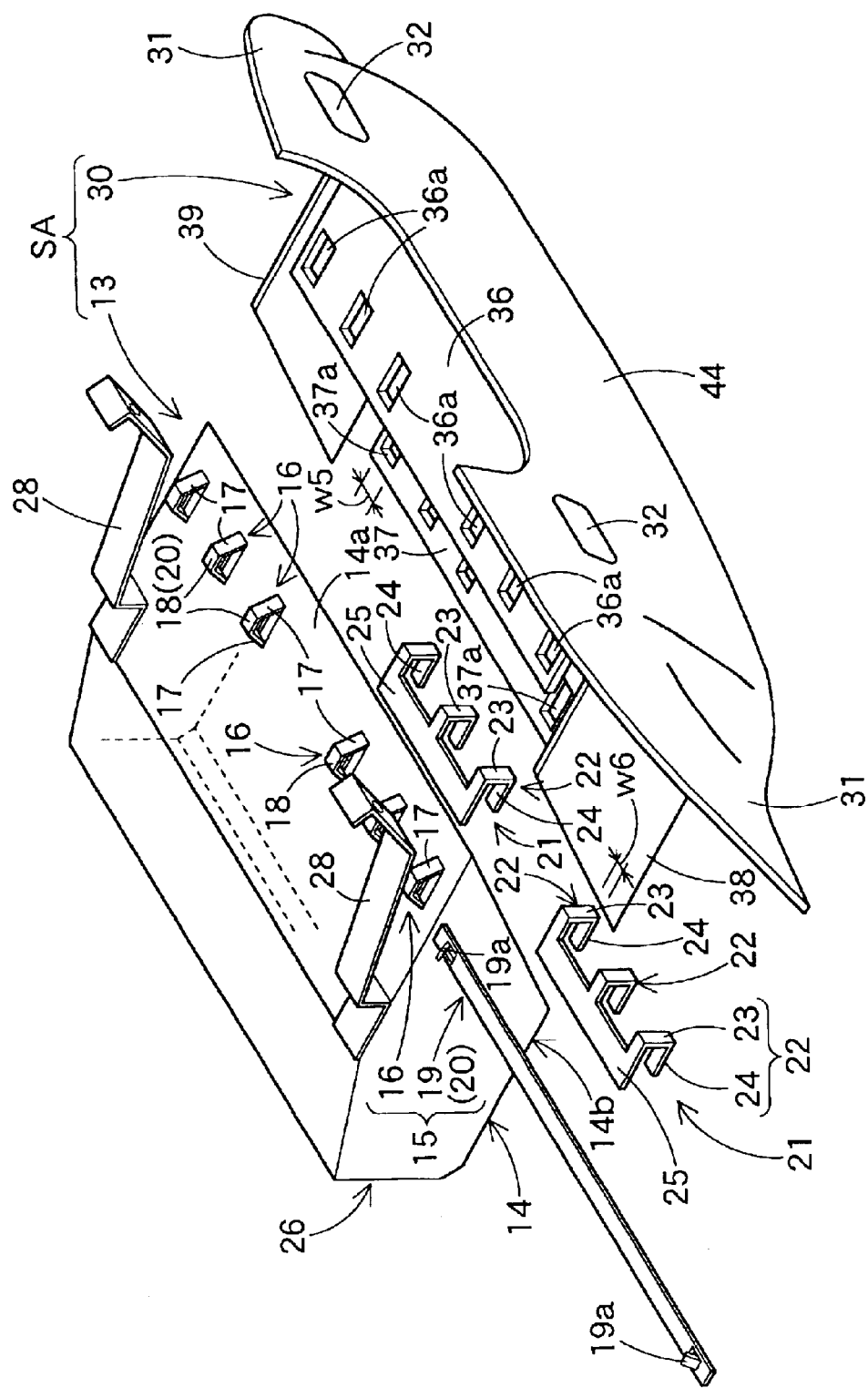
FIG. 4 is an exploded perspective view of an airbag cover and a case used for the knee protecting airbag device of the first embodiment.
Figure 6:
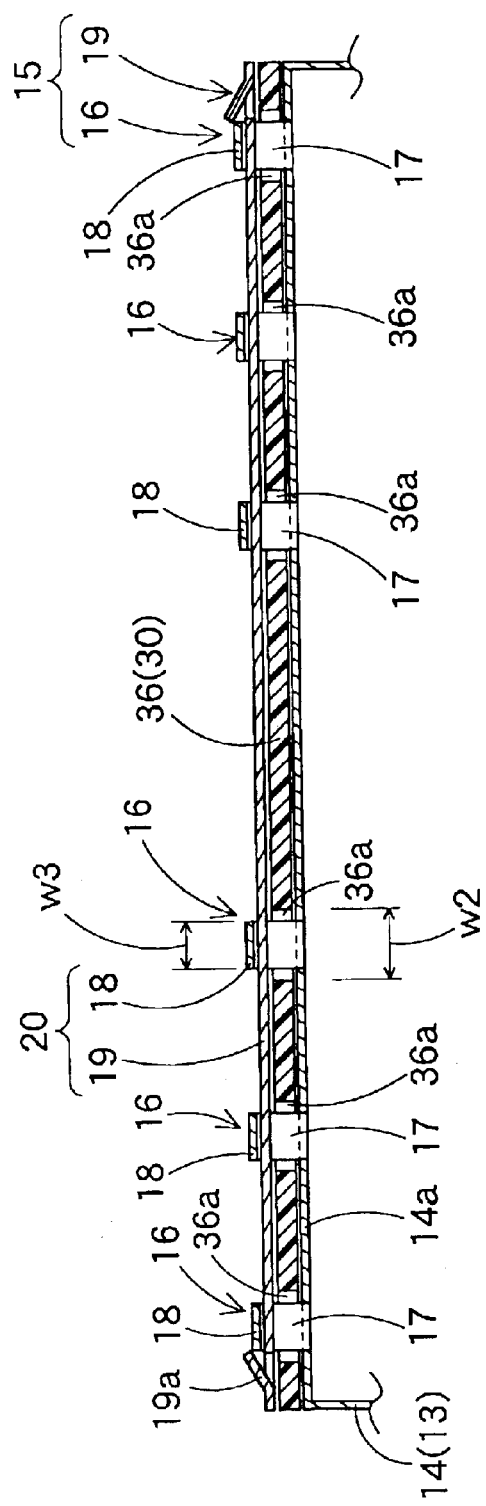
FIG. 6 is a partial enlarged section showing the connection state of the airbag cover and the case in the knee protecting airbag device of the first embodiment.

The locking bar 19 is provided with retaining pawls 19a and 19a near its two ends in the length direction, as shown in FIGS. 4 and 6. Each retaining pawl portion 19a is cut and raised to protrude obliquely upward and toward the center in the length direction (or toward the bent portion 18). Each retaining pawl 19a is so retained by the bent portion 18 on the two transverse sides of the wall portion 14a, when the locking bar 19 is inserted into the clearances between all the bent portions 18 and the upper wall portion 36, that the locking bar 19 may be prevented from coming out of the projections 16, as shown in FIG. 6., Incidentally, the projections 16 are formed simultaneously as the case 13 is pressed.

There are arranged two assembling members 21, made separate from the wall portion 14b, on the outer surface side of the wall portion 14b on the lower side. Each assembling member 21 is provided with a plurality of (e.g., three in the, embodiment) assembling bodies 22, and a fixing portion 25 arranged on the front end side of the assembling bodies 22 to fix the assembling bodies 22 on the wall portion 14b. Each assembling body 22 is formed to have a generally C-shaped section and is provided with a retaining frame 23 arranged to intersect the wall portion 14b generally perpendicularly, and a come-out stopper 24 bent toward the vehicular front side from the retaining frame 23 and arranged to intersect the retaining frame 23 generally perpendicularly. In the embodiment, as shown in FIG. 4, the fixing portion 25 is elongated in the vehicular transverse direction and is constructed by having the three assembling bodies 22 connected to its rear end side. The fixing portion 25 is fixed on the wall portion 14b by welding, for example. Moreover, each assembling body 22 has the retaining frame 23 inserted into the assembling hole 37a of the lower wall portion 37 as an assembling piece of the airbag cover 30 and the come-out stopper 24 protruded on the outer surface side of the lower wall portion 37 is retained on the peripheral edge of the assembling hole 37a. Thus, the lower wall portion 37 is assembled with the assembling member 21. Here in the embodiment, there are arranged two assembling members 21, each of which is provided with three assembling bodies 22. However, there may be arranged one assembling member provided with six assembling bodies.

In a side wall portion 14c of the peripheral wall portion 14, on the other hand, there is formed a through hole 14d, through which the end portion of the later-described body 48 of the inflator 47 is to be inserted (as referred to FIG. 3). In the bottom wall portion 26, on the other hand, there are formed through holes 26a for inserting the later-described bolts 49f of the inflator 47 therethrough.

On the wall portion 14a and the bottom wall portion 26, moreover, there are arranged mounting brackets 28 and 29 for mounting and fixing the case 13 on a dashboard reinforcement IR constructing the body B of the vehicle. The mounting brackets 28 on the wall portion 14a are fixed at two positions near the vehicular transverse ends and are individually fixed by means of bolts 62 on a bracket 61 extending from the dashboard reinforcement IR, as shown in FIGS. 1 and 2. The mounting brackets 29 on the bottom wall portion 26 are also fixed by means of bolts 65 on a bracket 64 extending from the dashboard reinforcement IR, as shown in FIGS. 1 and 2.

The airbag cover 30 is so formed of a thermoplastic elastomer of a polyolefin group as covers the vehicular rear side of the case 13 and is connected to and held by the case 13.

Moreover, the airbag cover 30 is arranged on the peripheral edge of the column cover 7 on the side of the lower panel 10b of the dashboard 10, and covers the lower side peripheral edge, as protrudes from the dashboard 10, of the column cover 7. Therefore, the airbag cover 30 is recessed so downward, as viewed from the vehicular rear side, near the upper edge center that the column cover 7 may protrude backward, and is so raised on the upper edge side below the recess portion as to be curved toward the vehicular rear side in a manner to correspond to the curved face of the column cover lower face 7a. The dashboard 10 as an interior parts of the vehicle is composed of an upper panel 10a and the lower panel 10b. The airbag cover 30 is provided with a door 44 to cover the opening 13a of the case 13, and a general portion 31 to be placed therearound and to be encircled by the lower panel 10 when mounted on the vehicle.

The door 44 is made slightly larger than the opening 13a and formed into a generally rectangular plate shape to cover the opening 13a. At the lower end of the door 44, there is arranged a hinge portion 43 which acts as the center of rotation when the door 44 is opened. A thin breakage-expected portion 42 is arranged at an inverted U-shaped portion of the outer peripheral edge excepting the hinge portion 43. This hinge portion 43 is made as an integral hinge and is thick enough not to be broken but thinner than the general portion 31 or the door 44. The breakage-expected portion 42 is grooved continuously or intermittently in the face on the vehicular front side so that it may be easily broken when the door 44 is pushed by the airbag 55 being inflated.

In the general portion 31, openings 31a are individually formed at positions located on the vehicular rear side of the mounting brackets 28 formed on the wall portion 14a of the case 13. These openings 31a are provided for the fixing work of the mounting brackets 28 on the bracket 61 by the bolts 62. After the mounting work of the airbag device S1 on the vehicle, the openings 31a are closed with caps 32, which are separate from the airbag cover 30.

At predetermined positions in the peripheral edge of the general portion 31, moreover, there are formed mounting legs 34, which extend toward the vehicular front for mounting and fixing the airbag cover 30 on the lower panel 10b. These mounting legs 34 are retained on the peripheral edges of retaining holes 10e of the lower panel 10b. Moreover, this lower panel 10b is provided with housing recess portions 10c for housing the case 13. In the flange 10d formed at the peripheral edges of the housing recess portions 10c, there are formed retaining holes 10e (as referred to FIG. 3). Here in the embodiment, four mounting legs 34 are formed individually near the two transverse edges of the general portion 31.

At the portions in the general portion 31 near the peripheral edge of the door 44, four side wall portions 36, 37, 38 and 39 are arranged protruding toward the vehicular front side to adjoin the peripheral wall portion 14 of the case 13 from outer side. The upper side wall portion 36 arranged on the upper side of the case peripheral wall portion 14 and the lower side wall portion 37 arranged on the lower side of the peripheral wall portion 14 are used as assembling pieces for assembling the airbag cover 30 with the case 13. These wall portions 36 and 37 are individually provided with assembling holes 36a and 37a, which penetrate the surface to the back. Moreover, these assembling holes 36a and 37a insert thereinto the retaining frames 17 and 23 of the assembling members 15 and 21 arranged on the case peripheral wall portion 14, respectively.

Moreover, the upper and lower side wall portions (or the assembling pieces) 36 and 37 and the assembling holes 36a and 37a are so formed that the airbag cover 30 is movable with respect to the case 13 when the airbag cover 30 is assembled with the case 13.

Figure 7:
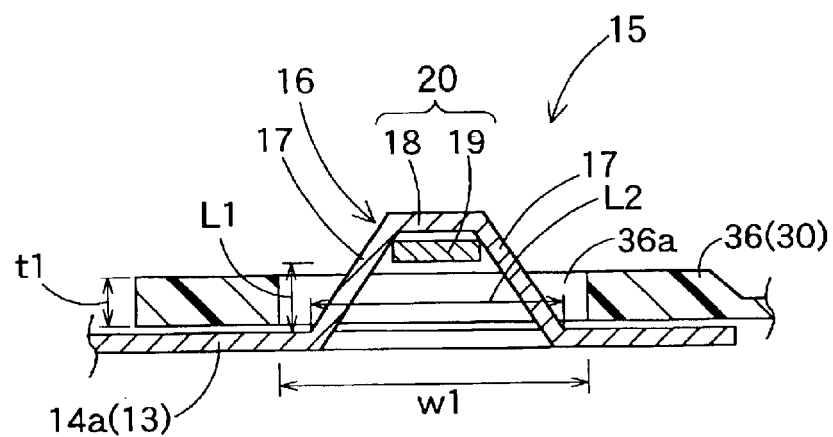
FIG. 7 is a partial enlarged section showing the connection state of the airbag cover and the case in the knee protecting airbag device of the first embodiment.

Specifically, as shown in FIG. 7, the upper wall portion 36 has a thickness t1 set smaller than the length L1 of the retaining frame 17 in the projection 16 retaining the locking bar 19, and the assembling hole 36a has a longitudinal length w1 set longer than a distance L2 between the retaining frames 17 and 17. Moreover, the assembling hole 36a has a transverse width w2 set wider than the transverse width w3 of the projection 16 (or the retaining frame 17), as shown in FIG. 6. In short, the upper wall portion 36 is so assembled with the case 13 as is movable vertically, longitudinally and transversely with the assembling member 15 being retained on the peripheral edge of the assembling hole 36a.

Figure 8:
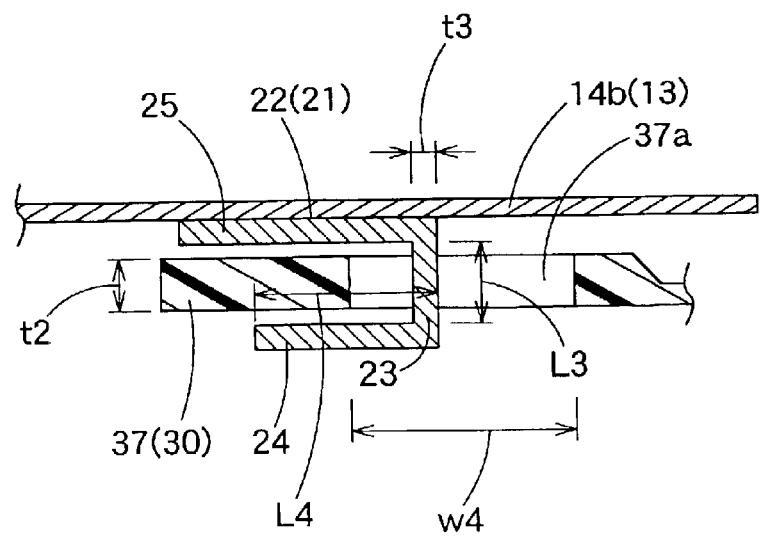
FIG. 8 is a partial enlarged section showing the connection state of the airbag cover and the case in the knee protecting airbag device of the first embodiment.

As shown in FIG. 8, moreover, the lower wall portion 37 has a thickness t2 set smaller than the length L3 of the retaining frame 23 in the assembling body 22, and the assembling hole 37a has a longitudinal length w4 set larger than the thickness t3 of the retaining frame 23. The assembling hole 37a has a transverse width w5 set wider than the transverse width w6 of the assembling body 22 (or the retaining frame 23), as shown in FIG. 4. In short, the lower wall portion 37 is so assembled with the case 13 as is movable vertically, longitudinally and transversely with the come-out stopper 24 of the assembling body 22 being retained on the peripheral edge of the assembling hole 37a. Here, the come-out stopper 24 has a length L4 set shorter than the longitudinal length w4 of the assembling hole 37a so as to be inserted into the assembling hole 37a.

These dimensions are so set that the airbag cover 30 may absorb the dimensional inconsistency arising in assembling with respect to the lower panel 10b arranged therearound, when the airbag device S1 is mounted on the vehicle after the airbag cover 30 was assembled with the case 13.

The inflator 47 is constructed as a cylinder type to have its axial direction arranged in the transverse direction of the vehicle, as shown in FIGS. 1 to 3. The inflator 47 is provided with a generally column-shaped body 48 and a diffuser 49. The body 48 is provided with a column-shaped general portion 48a and a diametrically smaller portion 48b protruding from the end face of the general portion 48a. A plurality of gas discharge ports 48c are arranged in the outer circumference of the diametrically smaller portion 48b. To the end face of the general portion 48a apart from the diametrically smaller portion 48b, moreover, there is connected a connector 51 which has a lead wire 52 connected therewith for inputting an actuating signal. The diffuser 49 is provided with a generally cylindrical holding cylinder 49a made of a sheet metal for covering the body 48, and a plurality of (e.g., two in the embodiment) bolts 49f protruding from the holding cylinder 49a. This holding cylinder 49a is provided at its leading end side with a bottom portion 49b for covering the diametrically smaller portion 48b of the body 48 housed therein and is so opened on its trailing end side as to insert the general portion 48a of the body 48 therefrom. Moreover, the holding cylinder 49a has a gas outlet port 49d opened in the vehicular rear side face in the holding cylinder 49a mounted on the vehicle. The gas outlet port 49d lets out the inflating gas discharged from the gas discharge ports 48c of the body 48. On the holding cylinder 49a, moreover, there are arranged a plurality of clamping portions 49e for holding the body 48. Each clamping portion 49e is cut out on the two sides in the axial direction of the holding cylinder 49a and is so plastically deformed to be curved internally in the holding cylinder 49a. Moreover, the body 48 is fixed in the holding cylinder 49a by inserting the body 48 from the opening on the trailing end side while being led by the diametrically smaller portion 48b and by pressing each clamping portion 49e further onto the outer circumference of the general portion 48a.

Here, to this inflator 47, an actuating signal is inputted through the lead wire 52 when the airbag actuating circuit mounted on the vehicle detects a front collision of the vehicle, simultaneously to a not-shown airbag device mounted on the steering wheel 1.

Figure 5:
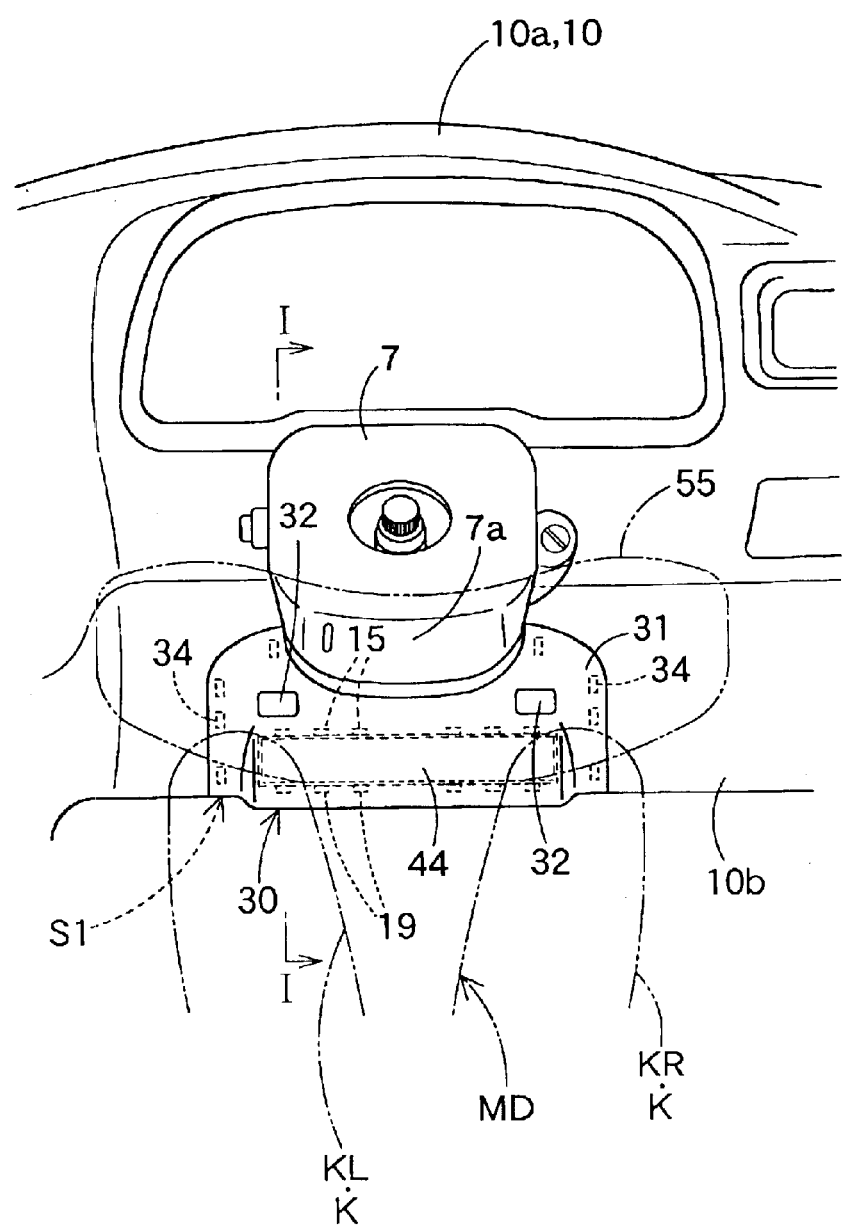
FIG. 5 is a schematic front view of the knee protecting airbag device of the first embodiment being deployed, as viewed from the vehicle's rear side.

The airbag 55 is formed of a flexible sheet of woven fabric made of polyester, polyamide or like yarns. The airbag 55 takes, when having completed its expansion and inflation, a generally rectangular plate shape, as indicated by double dotted lines in FIG. 1, and has such a transverse width as can protect the two knees KL and KR of the driver MD as an occupant M, as indicated by double-dotted lines in FIG. 5. In the portions on the lower end side of the airbag 55 having completed its expansion and inflation, moreover, there are formed two through holes 55a and 55a and one through hole 55b, as shown in FIG. 3. The through holes 55a and 55a insert the individual bolts 49f of the inflator 47 therethrough, and the through hole 55b inserts the body 48 of the inflator 47 therethrough. Moreover, the airbag 55 is mounted in the case 13 while the body 48 of the inflator 47 protruded from the through hole 55b and the peripheral edges of the individual through holes 55a clamped between the holding cylinder 49a and the bottom wall portion 26 of the case 13.

Here will be described how to assemble this airbag device S1. First of all, the inflator 47 is so housed in the airbag 55 that the bolts 49f are protruded from the through holes 55a, and that the end portion of the body 48 is protruded from the throughhole 55b. Then, the airbag 55 is folded up. After this, the airbag 55 is wrapped with a not-shown wrapping film which can be broken to prevent the airbag 55 from collapsing. At this time, the bolts 49f of the inflator 47 and the end portion of the body 48, as have protruded from the through holes 55a and 55b, are extracted from the wrapping film.

Next, the inflator 47 is housed together with the folded airbag 55 in the case 13 such that the individual bolts 49f of the inflator 47 are protruded from the through holes 26a and the end portion of the inflator body 48 is protruded from the through hole 14d. When nuts 50 are then fastened on the individual bolts 49f, the inflator 47 and the airbag 55 can be housed and mounted in the case 13.

Then, the airbag cover 30 is assembled with the case 13. At this time, the retaining frames 23 of the individual assembling body 22, as formed on the wall portion 14b of the case 13, are inserted into the individual assembling holes 37a of the lower wall portion (or the assembling piece) 37 in the airbag cover 30 thereby to retain the come-out stoppers 24 on the peripheral edges of the assembling holes 37a. Next, the individual projections 16 formed on the wall portion 14a are inserted into the individual assembling holes 36a of the upper wall portion (or the assembling piece) 36. Then, the locking bar 19 is inserted into the clearances between the upper wall portion 36 and the bent portions 18 protruded from the upper wall portion 36, and its retaining pawls 19a are retained on the bent portions 18. Thus, the airbag cover 30 can be assembled with the case 13 so as to form the airbag assembly SA.

Then, the airbag assembly SA is mounted and fixed on the dashboard reinforcement IR of the vehicle, on which the upper panel 10a and the lower panel 10b have already been mounted, by using the mounting brackets 28 and 29 to be arranged in the case 13. At the same time, the connector 51 having the lead wire 52 connected therewith is connected to the body 48 of the inflator 47. At this time, the mounting brackets 28 and 29 are fixed with the bolts 62 and 65 on the brackets 61 and 64 extending from the dashboard reinforcement IR, by making use of the openings 31a in the general portion 31 of the airbag cover 30 and the opening, at which the under cover 11 (as referred to FIGS. 1 and 2) is to be attached. After the airbag assembly SA was thus mounted and fixed, moreover, the caps 32 are mounted on the openings 31a of the airbag cover 30, and the under cover 11 is mounted. Thus, the airbag device S1 can be mounted on the vehicle.

When an actuating signal is inputted via the lead wire 52 to the body 48 of the inflator 47 after the airbag device S1 was mounted on the vehicle, the inflating gas is discharged from the gas discharge ports 48c of the inflator 47 to flow through the gas outlet port 49d of the diffuser 49 into the airbag 55. Accordingly, the airbag 55 is inflated to break the not-shown wrapping film and to push the door 44 of the airbag cover 30 so that it breaks the breakage-expected portion 42 to open the door 44 downward on the hinge portion 43. Moreover, the airbag 55 is expanded and inflated while largely protruding upward along the column cover lower face 7a, as indicated by the double-dotted lines in FIGS. 1 and 5.

In the airbag device S1 of the first embodiment, moreover, the airbag cover 30 is assembled movably with respect to the case 13. When the airbag assembly SA thus integrated is mounted on the vehicle, the airbag cover 30 may cause an assembling error such as dimensional inconsistency with respect to the lower panel 10b (or the interior parts) of the dashboard 10 arranged therearound. However, the airbag cover 30 absorbs the assembling error, if any, and moves with respect to the lower panel 10b while preventing dimensional disorder with the lower panel 10b and the general portion 31 arranged therearound.

In the knee protecting airbag device S1 of the embodiment, therefore, the integrated airbag assembly SA can be mounted on the vehicle while suppressing the assembling error between the airbag cover 30 and the interior parts such as the lower panel 10b of the dashboard 10. As a result, the appearance designs of the lower panel 10b and the airbag cover 30 is improved.

In the airbag device S1 of the first embodiment, moreover, there are arranged in the case peripheral wall portion 14 the assembling members 15 and 21 as the means for assembling the airbag cover 30 with the case 13. The retaining frames 17 and 23 of the assembling members 15 and 21 arranged on the case peripheral wall portion 14 are inserted into the assembling holes 36a and 37a, respectively, which are formed in the upper and lower side wall portions (or the assembling pieces) of the airbag cover 30, and the come-out stoppers 20 and 24 are retained on the peripheral edges of the assembling holes 36a and 37a. Then, the airbag cover 30 can be assembled with the case 13. In the first embodiment, therefore, the airbag cover 30 can be easily assembled with the case 13. Merely by arranging the assembling members 15 and 21 on the case peripheral wall portion 14 and by arranging the upper and lower wall portions 36 and 37 having the mounting holes 36a and 37a on the airbag cover 30, moreover, the airbag cover 30 can be assembled with the case 13 while absorbing the dimensional inconsistency arising in assembling with the lower panel 10b. In the first embodiment, therefore, the assembling structure can be simplified.

In the airbag device S1 of the first embodiment, moreover, the come-out stopper 20 of the assembling member 15 arranged on the upper wall portion 14a of the case peripheral wall portion 14 is constructed of the bent portion 18 which is formed integrally with the retaining frame 17, and the locking bar 19 which is made separate from the bent portion 18 and inserted into the clearance between the bent portion 18 and the upper wall portion 36 for preventing the bent portion 18 from coming out of the assembling hole 36a. In short, the bent portion 18 can be reliably prevented by the locking bar 19 from coming out of the assembling hole 36a, thereby to assemble the upper wall portion 36 of the airbag cover 30 tightly.

In the airbag device S1 of the first embodiment, still moreover, the assembling member 15 to assemble the upper wall portion 36 tightly is arranged on the wall portion 14a of the case 13, as positioned on the leading end side of the door 44 apart from the hinge portion 43. When the airbag 55 protrudes, therefore, the leading end side of the door 44 does not relatively move with respect to the case 13 even if it is pushed by the airbag 55. As a result, the pushing force of the airbag 55 easily acts on a breakage-expected portion 42a arranged at the leading end side of the door 44 so that the breakage-expected portion 42a is smoothly and properly broken to break the remaining breakage-expected portion 42 promptly. In short, the door 44 can be smoothly opened to expand and inflate the airbag 55 promptly. Without considering this point, the assembling member for assembling the assembling piece tightly does not have to be arranged at the portion of the case peripheral wall portion, as positioned on the leading end side of the door. For example, the construction may be modified to arrange the assembling member 15 on the wall portion 14b and to arrange the assembling member 21 on the wall portion 14a. In another construction, there may also be used an airbag cover, which has two doors to be vertically opened, by arranging the hinge generally in an H-shape, as viewed from the vehicular rear side.

Figure 9:
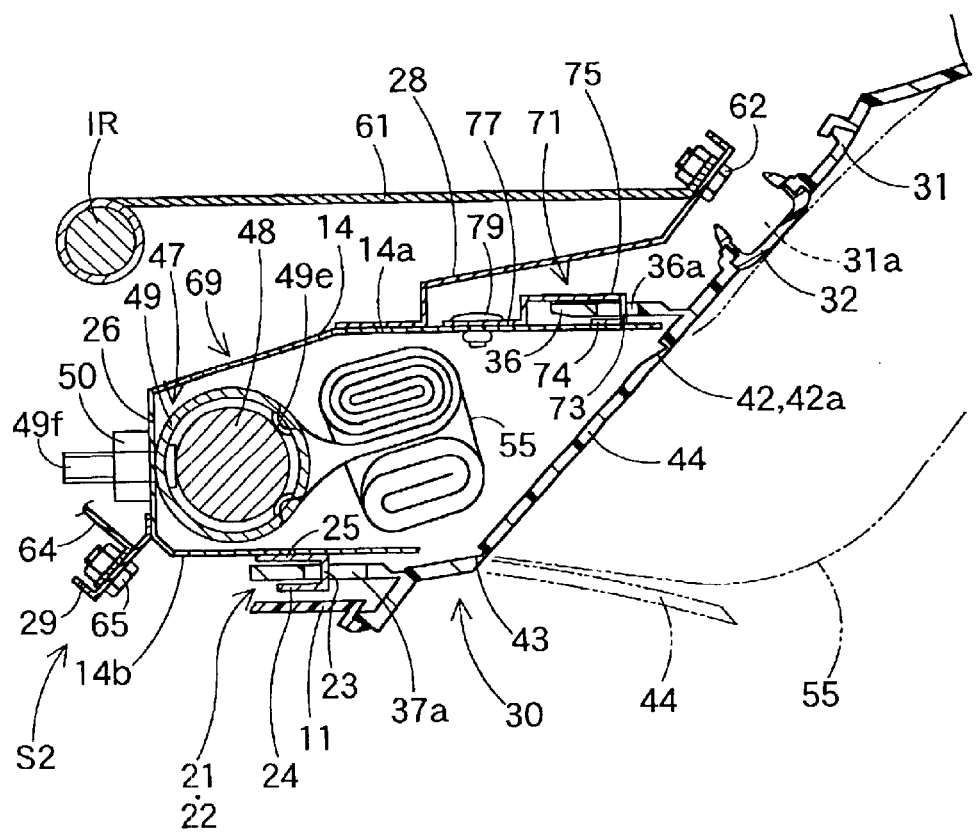
FIG. 9 is a schematic enlarged section in the vehicle's longitudinal direction of the knee protecting airbag device of the second embodiment.

An airbag device S2 according to a second embodiment is shown in FIG. 9. This airbag device S2 has similar parts to those of the aforementioned airbag device S1 except a case 69, so that their description will be omitted by designating them the same reference numerals as those of the first embodiment.

The case 69 of the airbag device S2 has a construction similar to that of the case 13 of the aforementioned airbag device S1 excepting the assembling member 71 to be arranged on the upper wall portion 14a in the peripheral wall portion 14.

Figure 10:
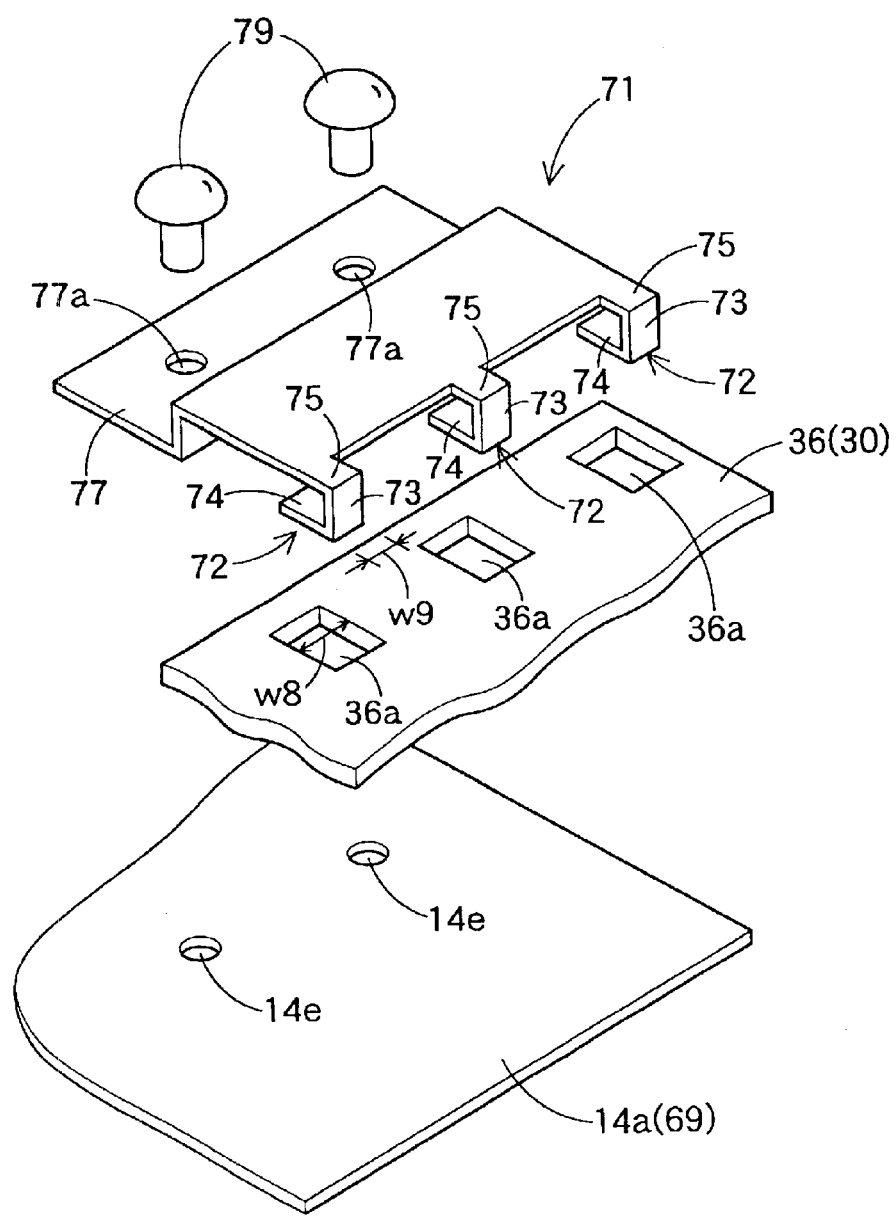
FIG. 10 is a partial exploded perspective view of the side wall of the airbag cover and the mounting member of the case used for the knee protecting airbag device of the second embodiment.

The assembling member 71 is made separate from the wall portion 14a and is provided with assembling bodies 72 and a fixing portion 77 as shown in FIG. 10. The fixing portion 77 is arranged on the front end side or on the end side apart from the retaining frames 73 in come-out stoppers 75 of the assembling bodies 72, and fixes the assembling bodies 72 on the wall portion 14a. Each assembling body 72 is formed to have a generally inverted U-shaped section and is provided with the retaining frame 73 arranged to intersect the wall portion 14a generally perpendicularly, and the come-out stopper 75 bent toward the vehicular front side from the retaining frame 73 and arranged to intersect the retaining frame 73 generally perpendicularly. At the end portion of the retaining frame 73 on the side of the wall portion 14a, there is arranged a bent portion 74, which is bent toward the vehicular front side from the retaining frame 73. In the embodiment, as shown in FIG. 10, the fixing portion 77 is so arranged in the vehicular transverse direction on the front end side of the assembling bodies 72 and is connected to the three assembling bodies 72. In the fixing portion 77, there are formed through holes 77a for inserting the later-described rivets 79 therethrough. In the embodiment, the assembling member 71 is enabled to retain the upper wall portion 36 by inserting the retaining frames 73 in the assembling bodies 72 into the assembling holes 36a from the upper side of the upper wall portion 36, retaining the bent portions 74 at the peripheral edges of the assembling holes 36a, and by fixing the fixing portion 77 on the wall portion 14a by means of the rivets 79. In the embodiment, the two assembling members 71 are arranged in the transverse direction of the wall portion 14a. In the wall portion 14a, moreover, there are formed through holes 14e for inserting the rivets 79 thereinto.

Figure 11:
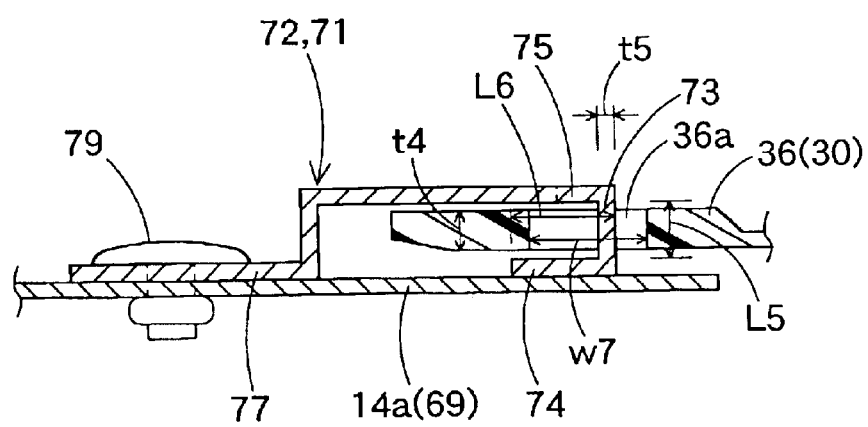
FIG. 11 is a partial enlarged section showing the connection state of the airbag cover and the case in the knee protecting airbag device of the second embodiment.

In the airbag device S2 of the second embodiment, too, the upper wall portion (or the assembling piece) 36 has a thickness t4 set smaller than the length L5 of the retaining frame 73 in the assembling body 72, and the assembling hole 36a has a longitudinal length w7 set larger than the thickness t5 of the retaining frame 73, as shown in FIG. 11. The assembling hole 36a has a transverse width w8 set wider than the transverse width w9 of the assembling body 72 (or the retaining frame 73), as shown in FIG. 10. By these settings, in other words, with the bent portions 74 of the assembling bodies 72 being retained on the peripheral edges of the assembling holes 36a, the upper wall portion 36 is so retained on the case 69 as is movable vertically, longitudinally and transversely. Here, the bent portions 74 have a length L6 set so shorter than the longitudinal length w7 of the assembling holes 36a as can be inserted into the assembling holes 36a.

The case 69 thus constructed connects the airbag cover 30 in the following manners. First of all, the come-out stoppers 24 are retained on the peripheral edges of the assembling holes 37a by inserting the retaining frames 23 of the individual assembling bodies 22 formed in the wall portion 14b of the case 69, into the individual assembling holes 37a of the lower wall portion 37 in the airbag cover 30. Next, the bent portions 74 are retained on the peripheral edges of the assembling holes 36a by inserting the retaining frames 73 of the individual assembling bodies 72 from the upper side into the individual assembling holes 36a of the upper wall portion 36, and the fixing portions 77 are fixed on the wall portion 14a by means of the rivets 79. Thus, the airbag cover 30 can be connected to and held on the case 69.

In the airbag device S2 using the case 69 thus constructed, too, the upper wall portion 36 of the airbag cover 30 is so retained on the case 69 as is movable vertically, longitudinally and transversely. In other words, the airbag cover 30 is movably assembled with the case 69 so that the same working-effects as those of the aforementioned airbag device S1 can be attained.

In the airbag device S2, moreover, the upper wall portion (or the assembling piece) 36 of the airbag cover 30 is assembled by inserting the retaining frames 73 of the assembling member 71 into the assembling holes 36a, retaining the bent portions 74 arranged at the end portion of the retaining frames 73 at the side of the wall portion 14a on the peripheral edges of the assembling holes 36a, and by fixing the fixing portion 77 of the come-out stoppers 75 on the wall portion 14a. In other words, the bent portions 74 are retained on the peripheral edges of the assembling holes 36a, and the upper wall portion 36 is clamped between the come-out stoppers 75 and the bent portions 74 from above and below, so that the assembling member 71 is fixed on the wall portion 14a by the fixing portion 77. Therefore, the retaining frames 73 are reliably prevented from coming out of the assembling holes 36a, so that the upper wall portion 36 of the airbag cover 30 is tightly assembled with the case peripheral wall portion 14.

In this airbag device S2, too, the assembling member 71 for assembling the upper wall portion 36 tightly is to be arranged at the wall portion 14a of the case 13, as positioned on the leading end side of the door 44 apart from the hinge portion 43. Therefore, this device S2 is also capable of expanding and inflating the airbag 55 promptly like the aforementioned airbag device S1.

Here, the foregoing embodiments have been exemplified by the airbag devices S1 and S2, which are arranged on the front side of the driver MD so as to protect the knees K of the driver MD. However, the airbag device having the aforementioned construction may be so arranged on the front side of a passenger seated in the front passenger's seat as to protect his knees.

Figure 26:
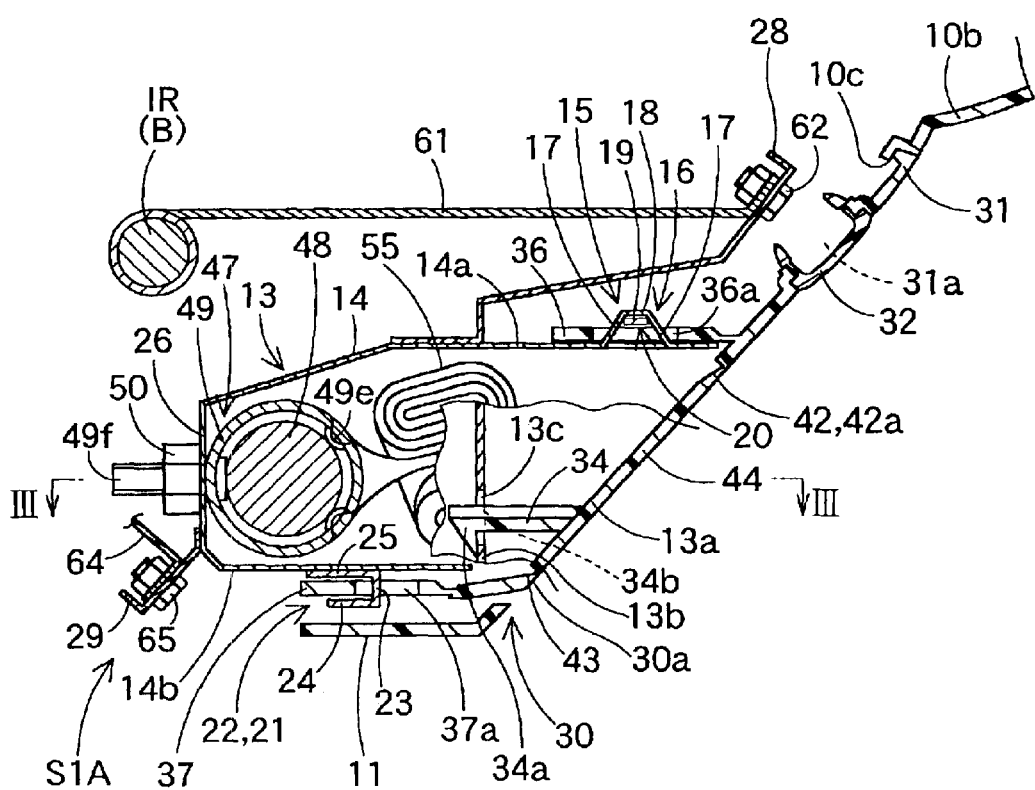
FIG. 26 is a schematic enlarged section showing a modification of the first embodiment.
Figure 27:
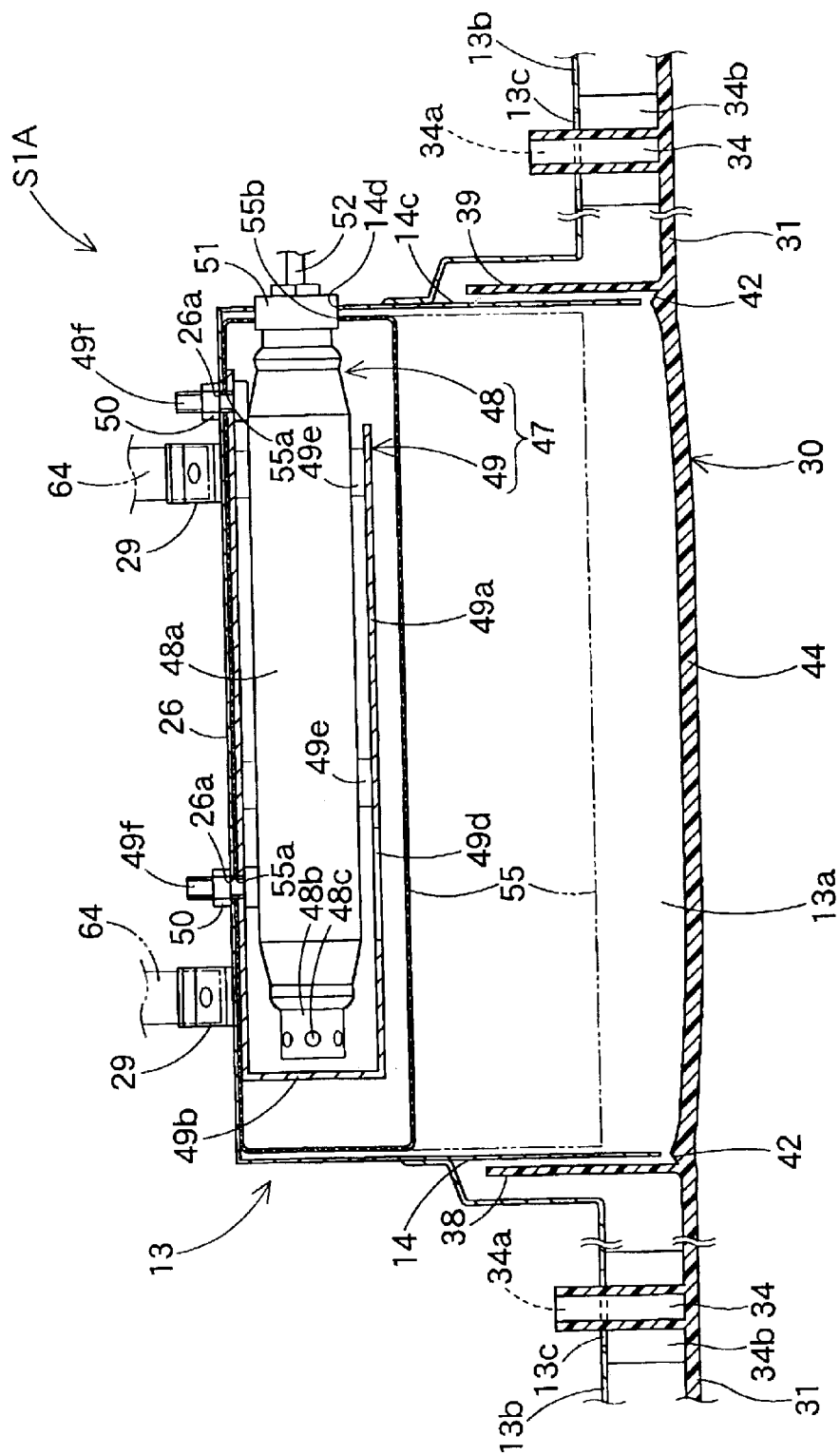
FIG. 27 is a schematic transverse section of the device of FIG. 26.

In case the airbag cover 30 is not connected to surrounding interior members such as an under cover 11 arranged on the lower side, the airbag device is constructed in the following manner. Specifically, the cover 30 is attached to the case 13 as shown in FIGS. 26 and 27. This is to prevent the lower edge 30a of the cover 30 from moving in the longitudinal direction, because the lower end 30a, which is not attached to the under cover 11, may move longitudinally after the airbag device S1A is mounted on a vehicle.

In this device S1A, the case 12 has panel portions 13b which extend transversely from the peripheral wall 14. The left and right panel portions 13b individually have a retaining hole 13c. The general portion 31 of the airbag cover 30 is formed to cover the rear side of the left and right panel portions 13b. In this general portion 31, there are provided retaining legs 34 to be inserted into the retaining holes 13c and retained by the panel portions 13b. Each of the retaining legs 34 has a rib 34b at its root side. When the panel portion 13b is retained, the rib 34b of each retaining leg 34 is abutted against the rear side of the panel portion 13b, thereby to prevent the lower edge 30a of the cover 30 from moving forward. Needless to say, the lower edge 30a of the cover 30 is prevented from moving rearward because the retaining leg head 34a is retained by the panel portion 13b.

The retaining leg 34 is retained by the panel portion 13b so that the airbag cover is restrained from moving in the longitudinal direction, but is movable vertically and transversely. This is to absorb the dimensional inconsistency between the peripheral edge of the airbag cover 30 except the lower edge 30a and the interior members except the under cover 11 such as the lower panel 10b.

This airbag device S1A is preferably adopted for a type provided with no interior member at the lower side, for example, for a front passenger's seat.

Figure 12:
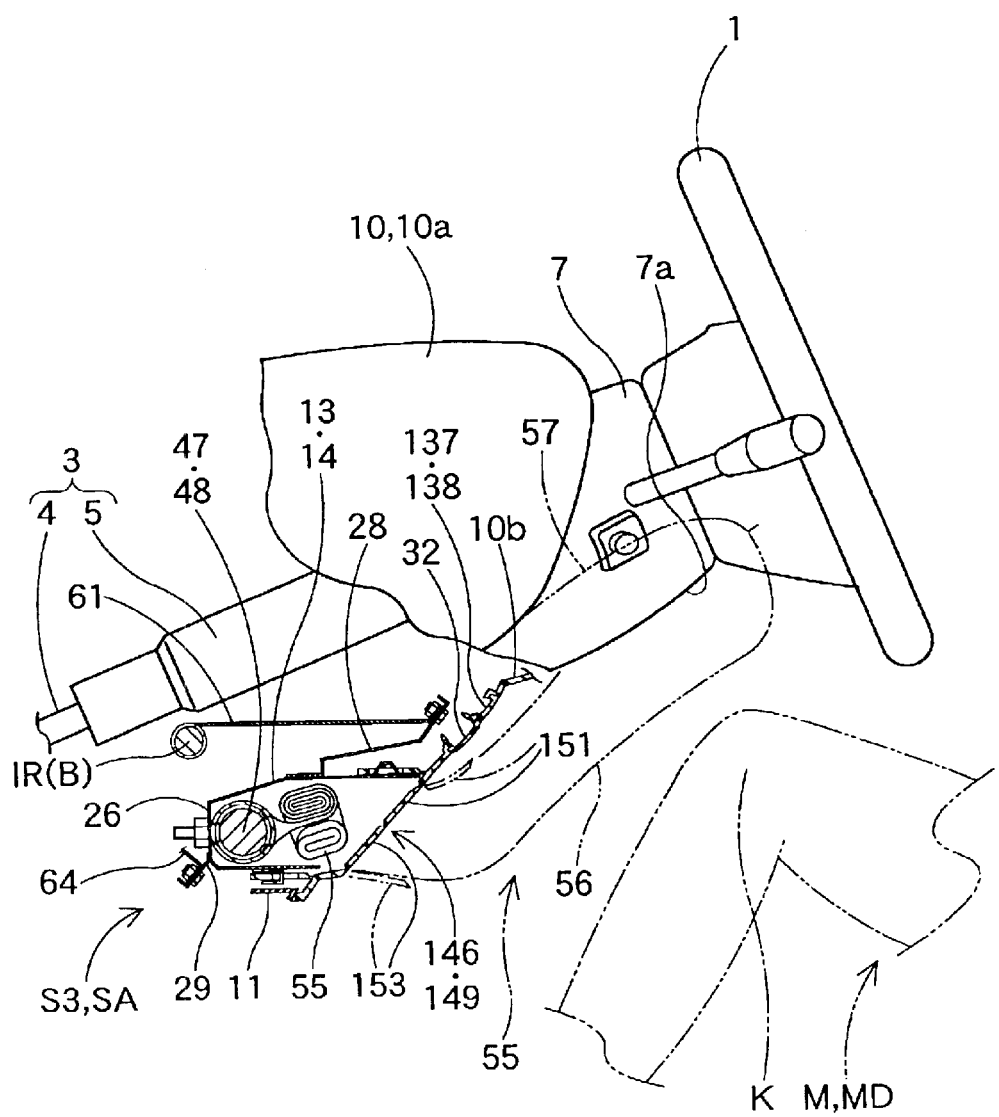
FIG. 12 is a schematic longitudinal section in the vehicle's longitudinal direction of the knee protecting airbag device of the third embodiment being deployed.
Figure 15:
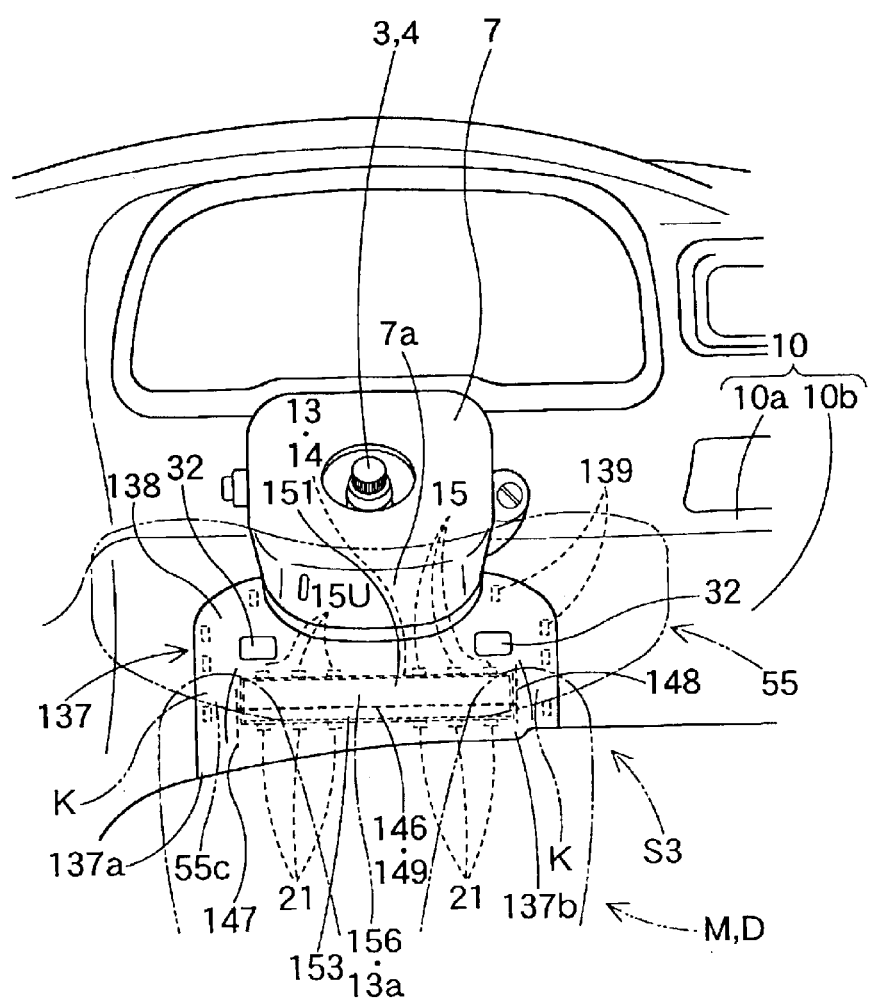
FIG. 15 is a schematic front view of the knee protecting airbag device of the third embodiment being deployed, as viewed from the vehicle's rear side.

As shown in FIGS. 12 and 15, a knee protecting airbag device S3 of a third embodiment is arranged below the steering column 3 on the vehicular front side of the driver MD as an occupant M so that it may protect the knees K of the driver MD. The knee protecting airbag device S3 is provided with the folded airbag 55, the inflator 47 for feeding the inflating gas to the airbag 55, the case 13 housing the folded airbag 55 and the inflator 47 and opened at its vehicular rear side, and an airbag cover 137 for covering the vehicular rear side of the case 13.

In the airbag device S3 of the third embodiment, moreover, the airbag cover 137 is different from those of the first and second embodiments, but the remaining members are similar to those of the first and second embodiments. In the airbag device S3 of the third embodiment, therefore, the same portions and members as those of the first and second embodiments are designated by the common reference numerals, and their description will be omitted.

Figure 14:
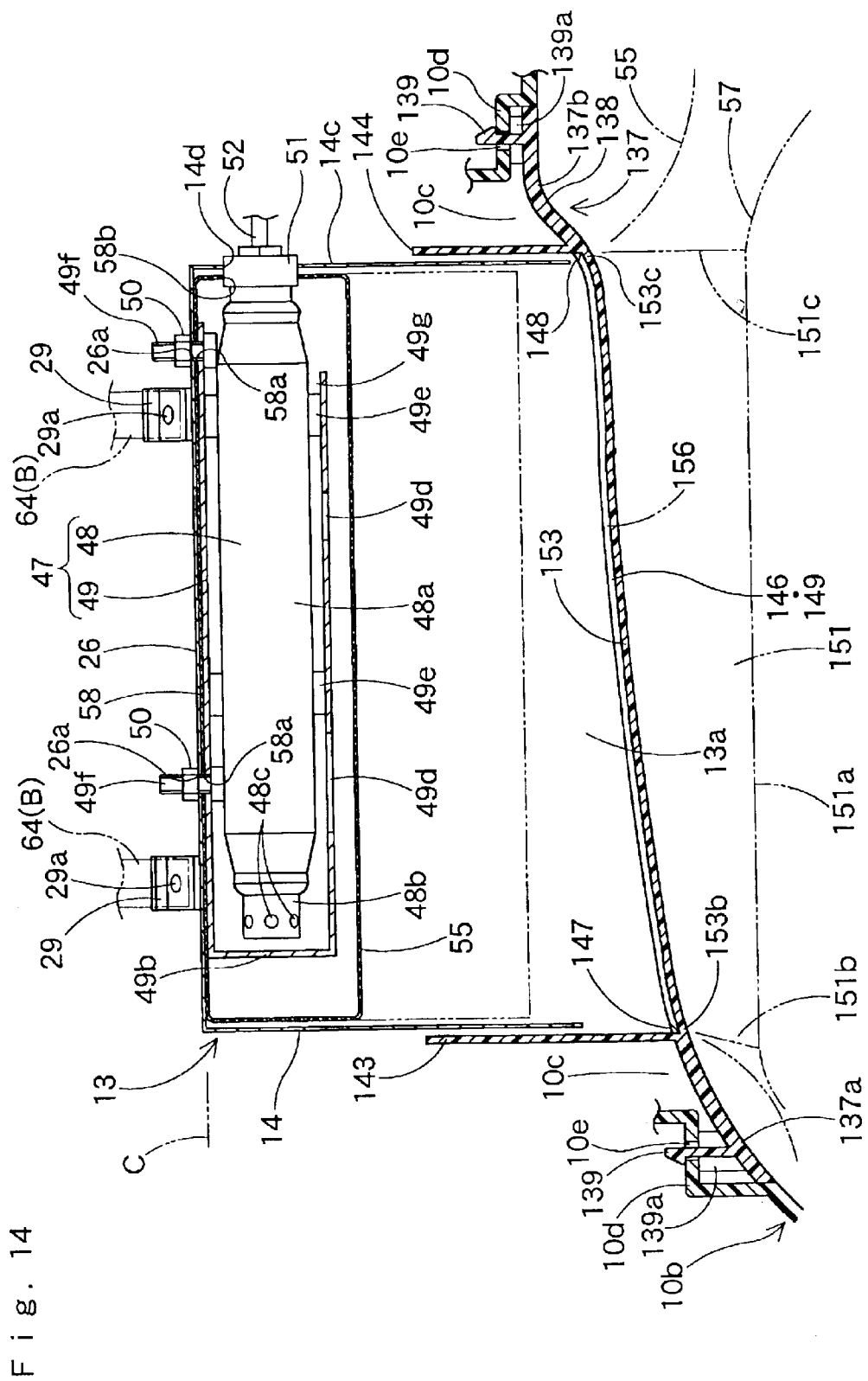
FIG. 14 is a sectional view taken along line XIV—XIV of FIG. 13.

Here, the airbag 55 is formed of a flexible sheet of woven fabric made of polyester, polyamide or like yarns and takes, when it completes its expansion and inflation, such a generally rectangular plate shape having a transverse width as to protect the two knees K of the driver MD as an occupant M, as shown by double-dotted lines in FIGS. 12 and 15. In the airbag 55 having completed its expansion and inflation, the occupant's side wall portion 56 is arranged on the side of the driver MD, and the body side wall portion 57 is arranged on the side of the column cover 7. These wall portions 56 and 57 are formed to have shapes generally identical to each other. In the portion 58 of the body side wall portion. 57 at the lower end side of the airbag 55 having completed its expansion and inflation, moreover, there are formed two through holes 58a and 58a and one through hole 58b, as shown in FIG. 14. The through holes 58a and 58a insert the individual bolts 49f of the inflator 47 thereinto, and the through hole 58b inserts the body 48 of the inflator 47 thereinto. Moreover, the airbag 55 is mounted on the case 13 by protruding the body 48 of the inflator 47 from the through hole 59b and by clamping the peripheral edges 58 of the individual through holes 58a between the diffuser 49 and the bottom wall portion 26 of the case 13. In this airbag 55, specifically, the peripheral edges of the through holes 58a are used as the mounting portion 58, which is mounted and fixed on the bottom wall portion 26 of the case 13 at the mounting line C (as referred to FIG. 14) extending in the transverse direction of the vehicle.

The airbag cover 137 is formed of a thermoplastic elastomer of a polyolefin group. The cover 137 is constructed to cover the vehicular rear sides of the folded airbag 55 and the case 13 and is connected to and held by the case 13. As shown in FIGS. 12 to 15, this airbag cover 137 is arranged on the peripheral edge of the column cover 7 on the side of the lower panel 10b of the dashboard 10, and covers the lower side peripheral edge of the column cover 7 protruding from the dashboard 10. The airbag cover 137 of the embodiment is arranged to protrude toward the vehicular rear side at the center side of the vehicle. Specifically, the airbag cover 137 is so longitudinally inclined that the side of the lefthand edge 137a is positioned at the vehicular rear side of the side of the righthand edge 137b.

Moreover, the airbag cover 137 is provided with two doors 151 and 153 covering the opening 13a of the case 13 at the vehicular rear side, and a general portion 138 arranged around the doors 151 and 153 and surrounded by the lower panel 10b when mounted on the vehicle.

Figure 16:
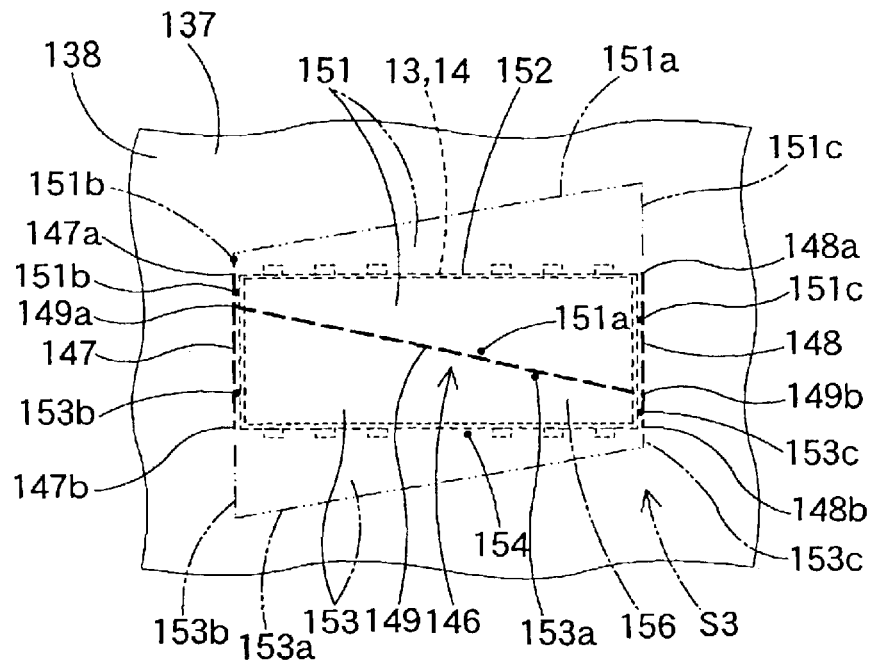
FIG. 16 is a front view of the airbag cover used for the third embodiment.

The doors 151 and 153 are formed into a generally rectangular sheet shape, and a thin breakage-expected portion 146 is arranged therearound, as shown in FIG. 16. This breakage-expected portion 146 is formed into a generally H-shape having two vertical lines 147 and 148 and one transverse line 149. The breakage-expected portion 146 has continuous or intermittent grooves in the vehicular front side face of the airbag cover 137 so as to be easily broken when the doors 151 and 153 are pushed by the airbag 55 being inflated.

Moreover, the door 151 is defined by the lefthand and righthand vertical lines 147 and 148 over the transverse line 149 in the H-shaped breakage-expected portion 146. This door 151 opened upward so that a lower end (or a leading end) 151a may move upward and rearward on a hinge portion 152 or the center of rotation, which is arranged at the position joining the upper ends 147a and 148a of the vertical lines 147 and 148. On the other hand, the door 153 is defined by the lefthand and righthand vertical lines 147 and 148 below the transverse line 149 in the H-shaped breakage-expected portion 146. This door 153 opens downward so that an upper end (or a leading end) 153a may move downward and rearward on a hinge portion 154 or the center of rotation, which is arranged at the position joining the lower ends 147b and 148b of the vertical lines 147 and 148. The opening 156, which is formed when those two doors 151 and 153 are opened, is formed into one rectangular shape slightly wider than the opening 13a of the case 13. The individual hinge portions 152 and 154 are integral hinges which is thick enough not to be broken, but thinner than the general portion 138 and the doors 151 and 153. Here in the case of the third embodiment, the individual hinges 152 and 153 are arranged in the horizontal direction.

Of these doors 151 and 153, moreover, the lefthand side edges 151b and 153b on the lefthand side (or the vehicular center side) are positioned on the more rear side of the vehicle or the closer to the driver MD than the righthand edges 151c and 153c on the righthand side as the airbag cover 137 is shifted in the longitudinal direction from left to right.

In the upward openable door 151, one lefthand side edge 151b close to the driver MD is given a shorter length, and the other righthand side edge 151c apart from the driver MD is given a longer length. Moreover, the lefthand end 149a of the transverse line 149 of the breakage-expected portion 146 is arranged at the higher level than the righthand end 149b. The difference in the length between the lefthand and righthand side edges 151b and 151c is so set that the leading end 151a arranged generally horizontally when the upward openable door 151 is opened may extend in the transverse direction of the vehicle, as viewed from above.

In the case of the third embodiment, moreover, in the vertical lines 147 and 148 of the H-shaped breakage-expected portion 146, the upper ends 147a and 148a and the lower ends 147b and 148b are positioned at the same level, respectively. In the downward operable door 153, therefore, the lefthand side edge 153b closer to the driver MD is given a longer length, and the other righthand side edge 153c apart from the driver MD is given a shorter length. Here, FIG. 16 shows, by the double-dotted lines, the doors 151 and 153 slightly returning toward the horizontal direction after they are fully opened in the vertical direction.

In the general portion 138 of the airbag cover 137 and at predetermined positions near the outer peripheral edge, there are formed a plurality of retaining legs 139, which are formed to extend toward the vehicular front side for a connection with the lower panel 10b, as shown in FIG. 14. These retaining legs 139 are retained on the peripheral edges of the retaining holes 10e of the lower panel 10b. On the root side of each retaining legs 139, there is formed a rib 139a. This rib 139a abuts, when the retaining leg 139 is retained on the peripheral edge of the retaining hole 10e, against the later-described flange 10d of the lower panel 10b, thereby to prevent the airbag cover 137 from falling toward the vehicular front side.

Moreover, the lower panel 10b is provided with the housing recess portions 10c for housing the case 13, and the retaining holes 10e are formed in the flanges 10d which are formed at the peripheral edges of the housing recess portions 10c.

Here in the third embodiment, four retaining legs 139 are formed near the lefthand and righthand edges of the general portion 138, respectively.

Figure 13:
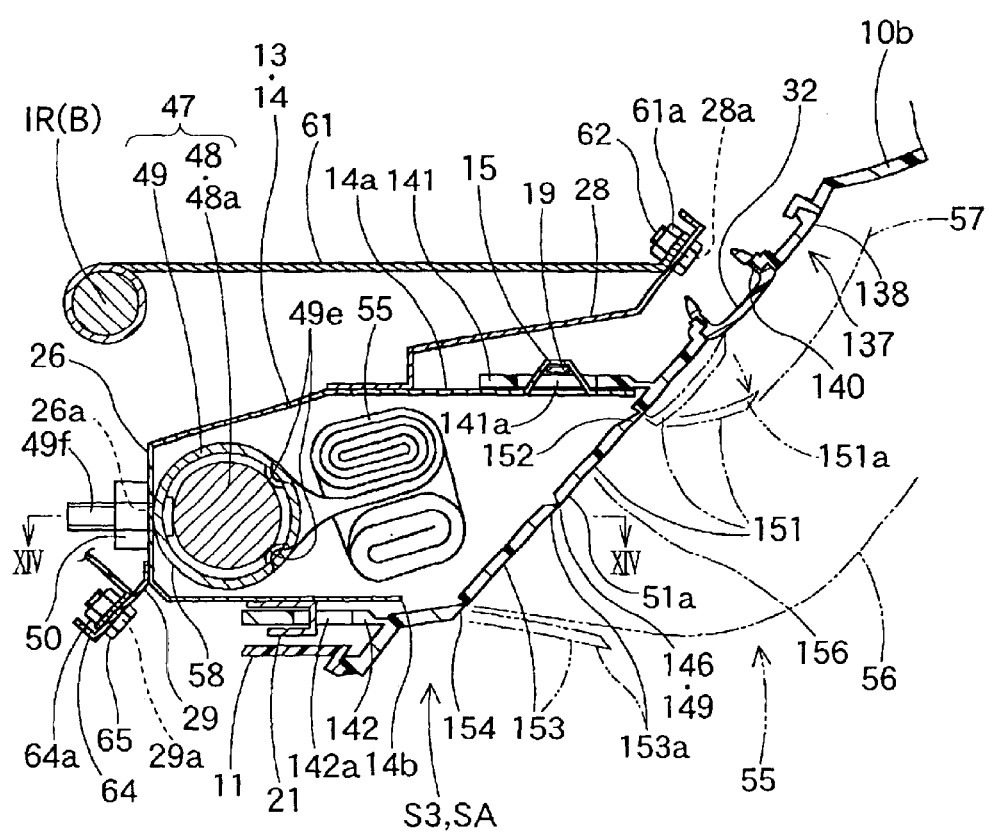
FIG. 13 is a schematic enlarged longitudinal section in the vehicle's longitudinal direction of the knee protecting airbag device of the third embodiment.

At the portions in the general portion 138 near the peripheral edges of the doors 151 and 153, there are formed four side wall portions 141, 142, 143 and 144, which protrude toward the vehicular front side to adjoin the peripheral wall portion 14 of the case 13, at the outer circumference of the wall portion 14, as shown in FIGS. 13 and 14. The upper wall portion 141 arranged on the upper side of the case peripheral wall portion 14 and the lower wall portion 142 arranged on the lower side of the peripheral wall portion 14 act to connect and hold the airbag cover 137 to and on the case 13. In these individual wall portions 141 and 142, respectively, there are formed retaining holes 141a and 142a for inserting and retaining the respective assembling members 15 and 21 arranged on the peripheral wall portion 14 therein.

In the general portion 138, moreover, there are arranged mounting holes 140 to be closed with the caps 32, at the positions on the vehicular rear side of the through holes 28a of the individual mounting brackets 28. Each of these mounting holes 140 is opened in a generally rectangular shape for the fixing work of the case 13 on the side of the body B by inserting the bolt 62 thereinto when the airbag assembly SA is mounted on the vehicle.

Here will be described how to assemble this airbag device S3. First of all, the inflator 47 having the diffuser 49 assembled with the body 48 is so housed in the airbag 55 that the bolts 49f are protruded from the individual through holes 58a and that the end portion of the body 48 is protruded from the through hole 58b. Next, the airbag 55 is folded up. Then, the airbag 55 is wrapped with not-shown collapse-preventing breakable wrapping film. At this time, the bolts 49f of the inflator 47 and the end portion of the body 48, as protruded from the through holes 58a and 58b, are further protruded from the wrapping film. Here, the wrapping film may be exemplified not only by sheet material made of resin but also by a cloth material, a tape material or a string material of the same woven fabric forming the airbag 55 or the like.

After this, the inflator 47 is so housed together with the folded airbag 55 in the case 13 that the individual bolts 49f of the inflator 47 are protruded from the through holes 26a and that the end portion of the inflator body 48 is protruded from the through hole 14d. When the nuts 50 are then fastened on the individual bolts 49f, the inflator 47 and the airbag 55 can be housed and mounted in the case 13.

Next, the airbag cover 137 is assembled with the case 13. For this assembly of the airbag cover 137 with the case 13: the individual side wall portions 141, 142, 143 and 144 of the airbag cover 137 are mounted around the case peripheral wall portion 14 on the side of the opening 13a; the assembling members 15 are inserted into the retaining holes 141a of the upper side wall portion 141 and protruded on the outer surface side of the upper side wall portion 141; and the individual assembling members 21 are inserted into the individual retaining holes 142a of the lower side wall portion 142 and retained on the peripheral edges of the retaining holes 142a. Next, the locking bar 19 is inserted into the clearance between the outer surface of the upper side wall portion 141 and the inner circumferential side faces of the individual assembling members 15 from one transverse end of the upper wall portion 141, and is fixed on the case 13. Then, the airbag cover 137 can be connected to and held by the case 13 to make the airbag assembly SA.

Then, the airbag assembly SA is mounted on the vehicle by connecting the connector 51, with which the lead wire 52 is connected, to the body 48 of the inflator 47, inserting and retaining the individual retaining legs 139 into and in the retaining holes 10e, and by housing the airbag cover 137 in the housing recess 10c of the lower panel 10b. Then, through holes 28a and 29a of the individual mounting brackets 28 and 29 extending from the case 13 are arranged at the positions of nuts 61a and 64a of the corresponding brackets 61 and 64 on the side of the body B, and the individual bolts 62 and 65 are fastened on the corresponding nuts 61a and 64a through the through holes 28a and 29a of the brackets 28 and 29. Thus, the airbag assembly SA can be fixed on the side of the body B.

By this time, the upper panel 10a, the lower panel 10b and so on have already been mounted on the vehicle. Moreover, the individual bolts 62 are inserted through the mounting holes 140, which have been opened by removing the caps 32, and are fastened on the nuts 61a.

Thus, the works to mount the airbag device S3 on the vehicle can be completed by closing the individual mounting holes 140 with the caps 32 after the individual bolts 62 and 65 were fastened, and by mounting the under cover 11 on the vehicle.

When an actuating signal is inputted to the body 48 of the inflator 47 through the lead wire 52 after the airbag device S3 was mounted on the vehicle, the inflating gas is discharged from the gas discharge ports 48c of the inflator 47 so that it flows into the airbag 55 through the gas outlet port 49d of the diffuser 49. Accordingly, the airbag 55 is inflated to break the not-shown wrapping film and to push the doors 151 and 153 of the airbag cover 137 thereby to break the breakage-expected portion 146, so that the upward openable door 151 is opened upward on the hinge portion 152 whereas the downward openable door 151 is opened downward on the hinge 154. Then, the airbag 55 is expanded and inflated, as indicated by double-dotted lines in FIGS. 12 and 15, to protrude toward the vehicular rear side from the opening 156 which is formed by the opened doors 151 and 153, and to protrude largely upward along the column cover lower face 7a.

In the airbag device S3 of the third embodiment, the upward openable door 151 is opened by turning the leading end 151a upward while being pushed by the airbag 55 being inflated, but may be returned, as shown in FIG. 13, to descend the leading end 151a toward the horizontal direction. In the upward openable door 151, however, one lefthand side edge 151b closer to the driver MD is given a shorter length, and the other righthand side edge 151c on the side apart from the driver MD is given a longer length, as shown in FIG. 16. Therefore, the upward openable door 151 can arrange its leading end 151a in the transverse direction of the vehicle, as indicated by double-dotted lines in FIG. 14. As a result, the airbag 55 can cause its occupant's side wall portion 56 to confront head-on the driver MD without being twisted, even if its body side wall portion 57 is pushed by the leading end 151a of the upward openable door 151.

Even with the upward openable door 151 having the two lefthand and righthand side edges 151b and 151c spaced at different distances in the vehicular longitudinal direction from the driver MD as an occupant M, therefore, the knee protecting airbag device S3 of the third embodiment can easily cause the expanded and inflated airbag 55 to confront the driver MD correctly to protect the knees K of the driver MD coming forward.

In the airbag cover 137 of the third embodiment, moreover, there is arranged below the upward openable door 151 the downward openable door 153 which has its upper end 153a adjoining the lower end 151a of the upward openable door 151 and which is opened by turning the side of its upper end 153a downward. Around the upward openable door 151 and the downward openable door 153, still moreover, there is arranged the breakage-expected portion 146 which has a generally H-shape as viewed from the vehicular rear side, and which can be broken by the push of the airbag 55 being expanded and inflated, to open the upward openable door 151 and the downward openable door 153. The breakage-expected portion 146 is constructed so that the lefthand and righthand vertical lines 147 and 148 of the H-shape confront each other transversely, and that the transverse line 149 of the H-shape of the breakage-expected portion 146 has the lefthand end 149a at a higher position than the righthand end 149b in the transverse direction of the vehicle.

With this construction, one rectangular opening 156 is formed when the breakage-expected portion 146 is broken by the push of the airbag 55 being inflated and the upward openable door 151 and the downward openable door 153 are opened. In this case, the opening 156 to allow the airbag 55 to protrude is formed more quickly than the case in which an opening of a similar area is formed by one upward openable door, because the opening 156 is split.

In the upward openable door 151, the transverse line 149 of the H-shape of the breakage-expected portion 146 is arranged at such an inclination in the transverse direction that one lefthand side edge 151b closer to the driver MD may be shorter whereas the other righthand side edge 151c apart from the driver MD may be longer. Therefore, the leading end 151a of the door 151 opened is arranged in the transverse direction of the vehicle. As a result, the airbag 55 confronts head-on the driver MD without being twisted, even if it is pushed by the leading end 151a of the upward openable door 151.

In the downward openable door 153, on the contrary, one lefthand side edge 153b close to the driver MD is given a longer length whereas the other righthand side edge 153c apart from the driver MD is given a shorter length. If the downward openable door 153 is arranged generally in the horizontal direction, more specifically, the occupant's side wall portion 56 in the airbag 55 closer to the driver MD is pushed up by the leading end 153a on the longer side of the lefthand side edge 153b. In the airbag 55 protruded from the opening 156 which is formed by the upward openable door 151 and the downward openable door 153, therefore, the vicinity of the lefthand edge 55c close to the driver MD is pushed up by the leading end 153a on the side of the longer lefthand side edge 153b of the downward openable door 153. As a result, this construction can cause the airbag 55 having completed its inflation to confront head-on the driver MD as an occupant M while further suppressing the twisting of the airbag 55.

Figure 17:
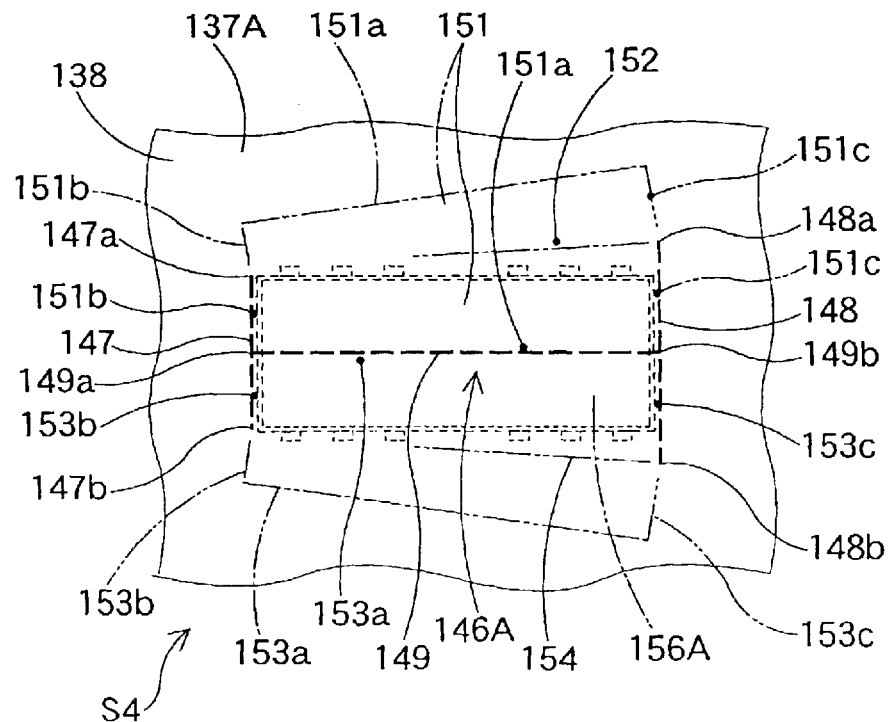
FIG. 17 is a front view of the airbag cover used for the fourth embodiment.
Figure 18:
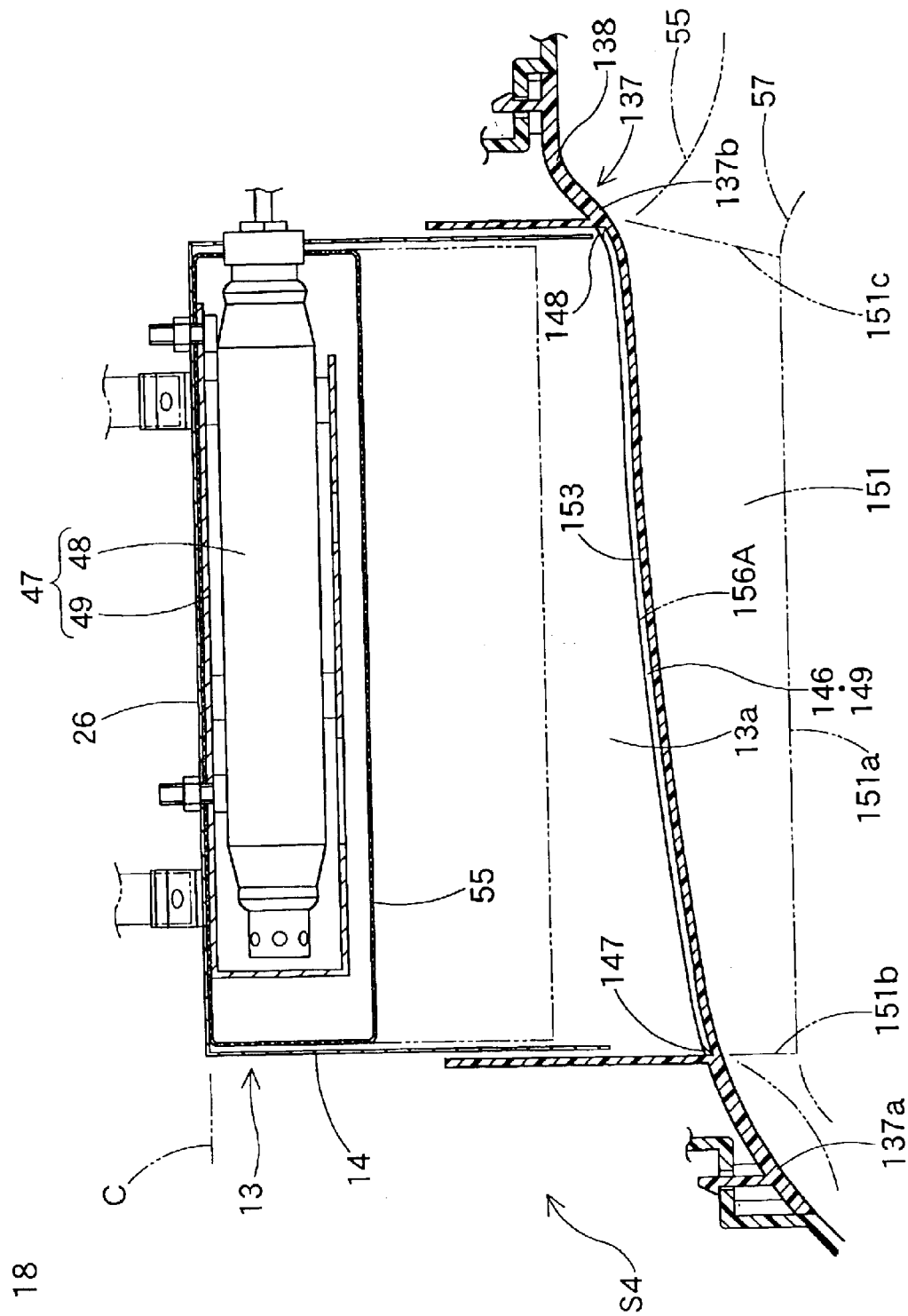
FIG. 18 is a schematic transverse section of the knee protecting airbag device of the fourth embodiment.

Here in case the two upward and downward openable doors are provided, the airbag device may be constructed as an airbag device S4 according to a fourth embodiment, as shown in FIGS. 17 and 18. In this airbag cover 137A, the righthand side vertical line 148 forming the H-shaped breakage-expected portion 146A is made longer than the lefthand side vertical line 147, so that the upper and lower ends 148a and 148b are displaced upward and downward, respectively, from the upper and lower ends 147a and 147b of the lefthand vertical line 147. The difference in length between the lefthand and righthand side edges 151b and 151c in the upward openable door 151 is so set that the leading end 151a of the door 151 which is opened and arranged generally in the horizontal direction may extend in the transverse direction of the vehicle. Moreover, the transverse line 149 of the H-shape is arranged in the horizontal direction. Therefore, the doors 151 and 153 of the airbag cover 137A are vertically symmetric with respect to the transverse line 149.

With this construction, too, one opening 156A of a generally rectangular shape (or a trapezoidal shape) is formed when the breakage-expected portion 146A is broken by the push of the airbag 55 being inflated to open the upward openable door 151 and the downward openable door 153. Therefore, the opening 156A to protrude the airbag 55 is more promptly formed than the case in which an opening of the similar area is formed by one upward openable door, because the opening 156A is split, so that the airbag 55 is expanded and inflated promptly. Here, this opening 156A is larger, especially on its righthand edge side, than the opening 13a of the case 13.

The upward openable door 151 of this airbag cover 137A is arranged such that one lefthand side edge 151b closer to the driver MD is shorter whereas the other righthand side edge 151c apart from the driver MD is longer. As indicated by double-dotted lines in FIG. 18, therefore, the leading end 151a of the door 151 opened is arranged in the transverse direction of the vehicle. As a result, the airbag 55 is enabled to confront the driver MD correctly without being twisted, even if it is pushed by the leading end 151a of the upward openable door 151.

In the case of the shown embodiment, moreover, the downward openable door 153 is so arranged that the one lefthand side edge 153b on the side close to the driver MD is shorter whereas the other righthand side edge 153c on the side apart from the driver MD is longer. When the opened door 153 is arranged generally horizontally, therefore, the leading end 153a of the downward openable door 153 is also arranged in the transverse direction of the vehicle like the leading end 151a of the upward openable door 151.

Here, the third embodiment has been described on the case of providing the downward openable door 153 in addition to the upward openable door 151 on the airbag cover 137. However, the airbag cover 137 may be constructed to arrange only one upward openable door 151.

Moreover, the third embodiment has also been described on the case in which the lower end (or the leading end) 151a of the upward openable door 151 is formed straight. However, the lower end 151a may also be slightly curved upward or downward.

Moreover, the third and fourth embodiments have been exemplified by the airbag devices S3 and S4 which are arranged on the front side of the driver MD so as to protect his knees K. However, the airbag device of the construction thus far described may be arranged at the front side of a passenger seated in the front passenger's seat so as to protect his knees.

Figure 19:
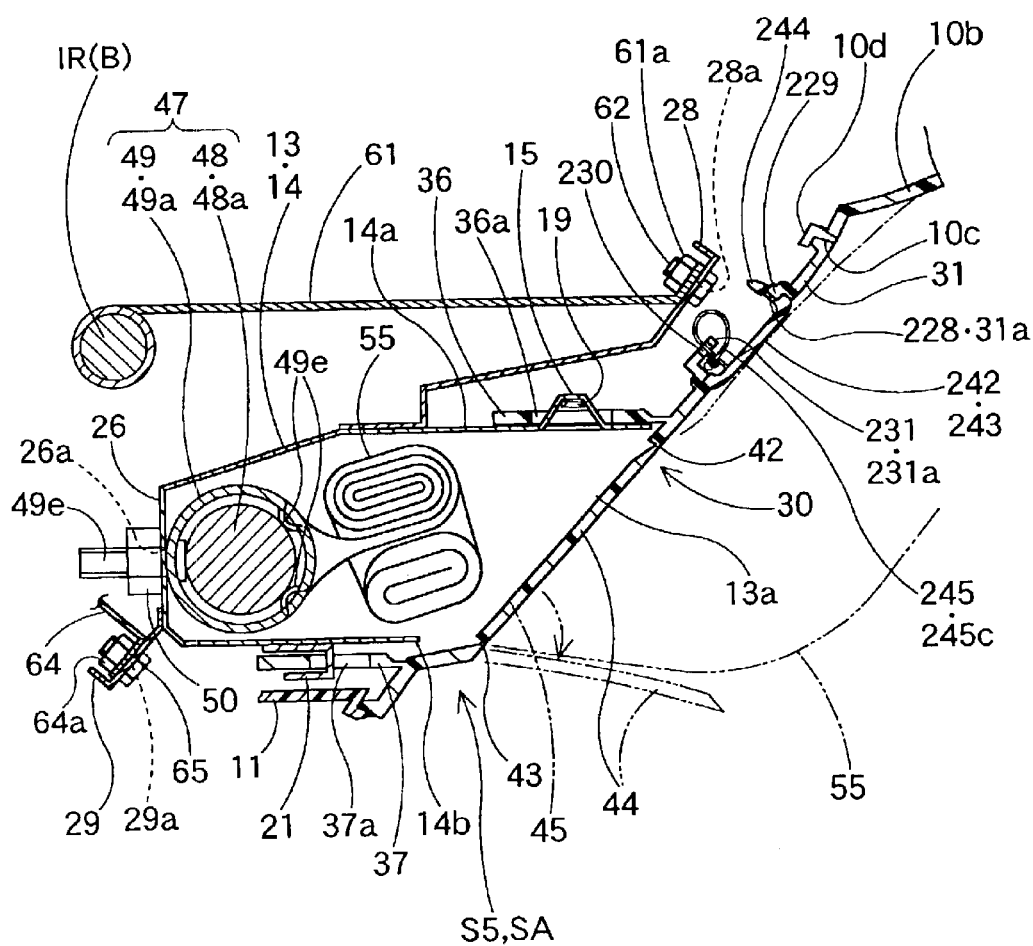
FIG. 19 is a schematic enlarged section in the vehicle's longitudinal direction of the knee protecting airbag device of the fifth embodiment.
Figure 20:
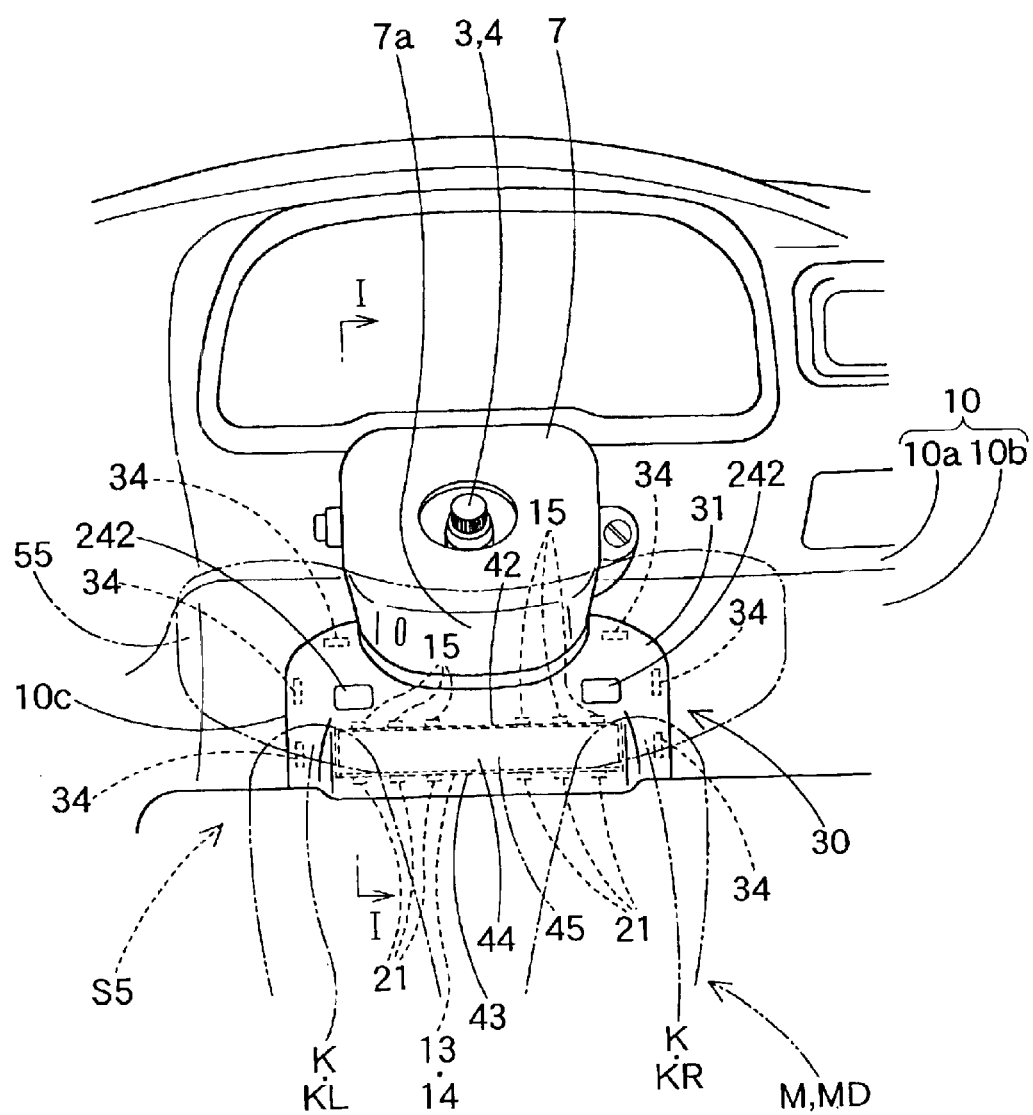
FIG. 20 is a schematic front view of the knee protecting airbag device of the fifth embodiment being deployed, as viewed from the vehicle's rear side.

As shown in FIGS. 19 and 20, a knee protecting airbag device S5 of a fifth embodiment is provided with the folded airbag 55, the inflator 47 for feeding the inflating gas to the airbag 55, the case 13 opened at the vehicular rear side for housing the folded airbag 55 and the inflator 47, and the airbag cover 30 for covering the vehicular rear side of the case 13.

In the airbag device S5 of the fifth embodiment, caps 242 mounted on the airbag cover 30 and the vicinities of the openings 31a (or the vicinities of mounting holes 228) to be closed with the caps 242 are different from the caps 32 and the vicinities of the openings 31a of the first embodiment, but the remaining members are similar to those of the first embodiment. In the airbag device S5 of the fifth embodiment, therefore, the same portions and members as those of the first embodiment are designated by the common reference numerals but will not be described.

In the general portion 31 of this airbag cover 30, the mounting holes 228 closed with the caps 242 are individually arranged at positions on the vehicular rear side of the through holes 28a of the individual mounting brackets 28. Each mounting hole 228 is opened in a generally rectangular shape for the fixing work of the case 13 on the side of the body B by inserting the bolt 62 thereinto when the airbag assembly SA is mounted on the vehicle. These mounting holes 228 are arranged at positions which are to be covered with the airbag 55 having completed its expansion and inflation, as shown in FIGS. 19 and 20. At the inflating time, the airbag 55 protrudes toward the vehicular rear side from an opening 45 of the airbag cover 30 formed by the door 44, and ascends to complete its expansion and inflation. In the case of the fifth embodiment, the individual mounting holes 228 are arranged at positions over the vicinities of the two lefthand and righthand edges of the door 44 in the general portion 31.

Figure 21:
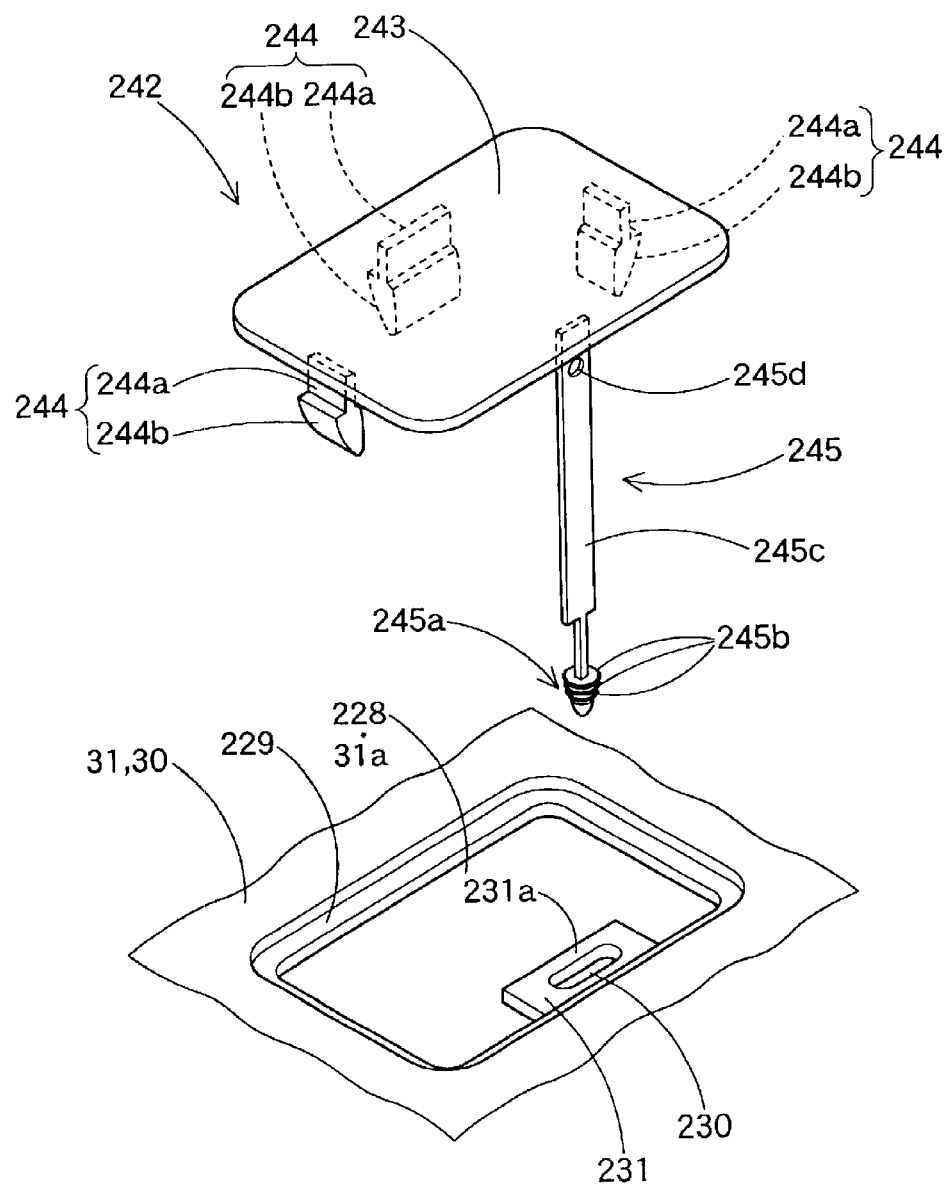
FIG. 21 is an exploded perspective view of a cap and a mounting hole used for the fifth embodiment.
Figure 22:
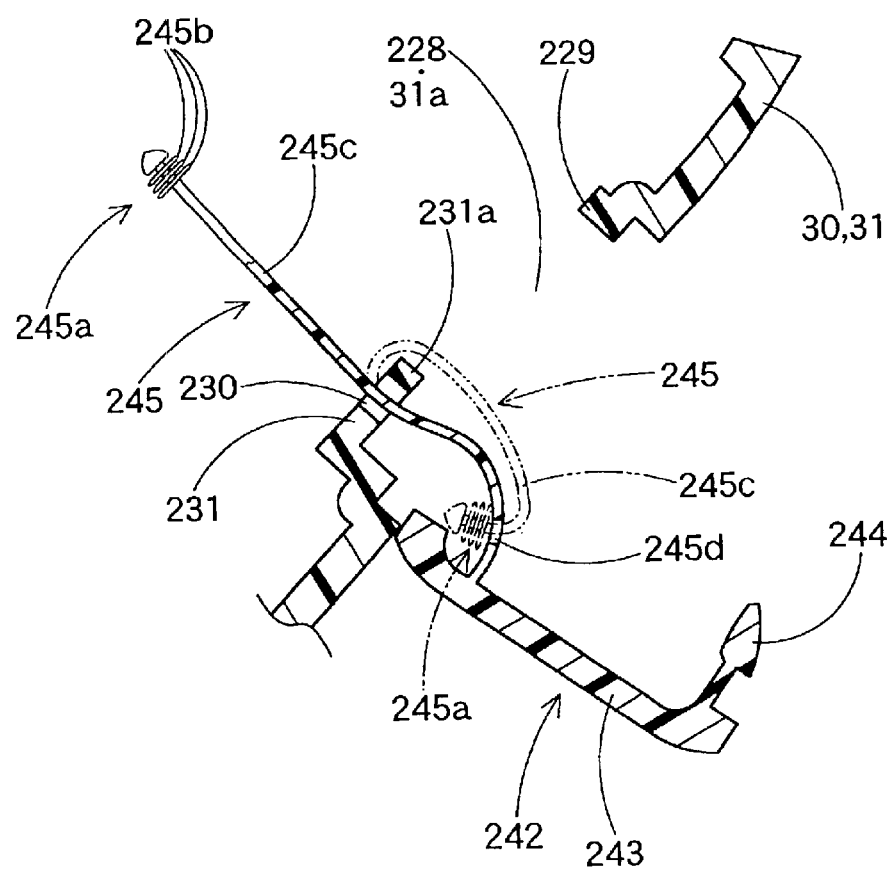
FIG. 22 is a diagram showing a connection band of the cap of the fifth embodiment being connected to the airbag cover.

On the peripheral edge of each mounting hole 228, as shown in FIGS. 21 and 22, there is formed a flange 229, which is recessed from the general portion 31 toward the vehicular front side. On the lower edge side in the flange 229 on the side of the door 44, moreover, there is formed integrally with the general portion 31 a ring 231 of a rectangular annulus, with a connection hole 230 arranged on the inner peripheral side.

The cap 242 for closing each mounting hole 228 is formed of a synthetic resin such as polypropylene, as shown in FIGS. 19 and 21. Each cap 242 is provided with a cover body 243 of a generally rectangular plate shape to be fitted in the corresponding mounting hole 228, three retaining pawls 244 arranged to protrude toward the vehicular front side from the outer peripheral edge of the cover body 243, and one connection band 245, all of which are molded integrally.

The retaining pawls 244 are formed at three portions on the upper edge side and the two lefthand and righthand edges of the cover body 243 in the vehicle-mounted state. Each retaining pawl 244 is provided with a stem portion 244a extending from the cover body 243, and a hook 244b arranged at the leading end of the stem portion 244a and capable of being retained on the vehicular front side face of the flange 229.

The connection band 245 constructs a connection means for connecting the cap 242 to the airbag cover 30 unremovably, and is formed into a string shape (or a band shape) having a flexibility. This connection band 245 is provided with a retaining head portion 245a arranged at the leading end of a string-shaped stem portion 245c having a flexibility, and a retaining hole 245d arranged in the root side of the stem portion 245c and capable of retaining the retaining head portion 245a inserted thereinto. The retaining head portion 245a flexes, when inserted into the retaining hole 245d, elastically like a spring to pass through the retaining hole 245d, and is righted when it comes out of the retaining hole 245d so that it is retained on the peripheral edge of the retaining hole 245d unremovably. In the case of the fifth embodiment, the retaining head portion 245a is formed of a plurality of flexible retaining plates 245b. The contour size and the number of retaining plates 245b are so set as to prevent the retaining head portion 245a from easily coming out of the retaining hole 245d when the retaining head portion 245a is inserted into the retaining hole 245d and retained on the peripheral edge of the retaining hole 245d.

Moreover, the connection band 245 is connected to the ring 231, as shown in FIG. 22, by inserting the retaining head portion 245a into the connection hole 230 of the ring 231, bending the stem portion 245c so that the connection band 245 may bind a part 231a of the ring 231, and by inserting the retaining head portion 245a into the retaining hole 245d.

The length of the stem portion 245c of the connection band 245 and the position of the retaining hole 245d are so set that the cap 242 may be movable relative to the ring 231 to open the whole area of the mounting hole 228 even if the connection band 245 is connected to the ring 231 while binding the part 231a of the ring 231.

Here will be described how to assemble this airbag device S5. First of all, as in the first embodiment, the inflator 47 having the diffuser 49 assembled with the body 48 is so housed in the airbag 55 that the bolts 49f are protruded from the individual through holes 55a (not shown) and that the end portion of the body 48 is protruded from the through hole 55b (not shown). Next, the airbag 55 is folded up. Then, the airbag 55 is wrapped with a not-shown collapse-preventing breakable wrapping film. At this time, the bolts 49f of the inflator 47 and the end portion of the body 48, as protruded from the through holes 55a and 55b, are extracted from the wrapping film. Here, the wrapping film may be exemplified not only by a sheet material made of resin but also by a cloth material, a tape material or a string material of the woven fabric forming the airbag 55 or the like.

After this, the inflator 47 is so housed together with the folded airbag 55 in the case 13 that the individual bolts 49f of the inflator 47 are protruded from the through holes 26a and that the end portion of the inflator body 48 is protruded from the through hole 14d (not shown). When the nuts 50 are then fastened on the individual bolts 49f, the inflator 47 and the airbag 55 can be housed and mounted in the case 13.

Next, the airbag cover 30 is connected to the case 13. Here in the airbag cover 30, the connection band 245 of the cap 242 is connected in advance to the ring 231 of each mounting hole 228. At this time, each retaining pawl 244 is not retained on the peripheral edge of the mounting hole 228, but this mounting hole 228 is opened.

For assembling the airbag cover 30 with the case 13: the individual side wall portions 36, 37, 38 (not shown) and 39 (not shown) of the airbag cover 30 are mounted on the case peripheral wall portion 14 on the side of the opening 13a; the assembling members 15 are inserted into the retaining holes 36a of the upper side wall portion 36 and protruded on the outer surface side of the upper side wall port ion 36; and the individual assembling members 21 are inserted into the individual retaining holes 37a of the lower side wall portion 37 and retained on the peripheral edges of the retaining holes 37a on the outer surface side of the lower sidewall portion 37. Next, the locking bar 19 is inserted into the clearances between the outer surface of the upper side wall portion 36 and the inner circumferential side faces of the individual assembling members 15 from one side of lefthand and righthand edge of the upper side wall portion 36, and is fixed on the case 13. Then, the airbag cover 30 can be connected to and held by the case 13 to make the airbag assembly SA.

Then, the airbag assembly SA is mounted on the vehicle by connecting the connector 51 (not shown), with which the lead wire 52 (not shown) is connected, to the body 48 of the inflator 47, inserting and retaining the individual retaining legs 34 into and in the retaining holes 10e (as referred to FIG. 3), and by housing the airbag cover 30 in the housing recess 10c of the lower panel 10b. Then, through holes 28a and 29a of the individual mounting brackets 28 and 29 extending from the case 13 are arranged at the positions of nuts 61a and 64a of the corresponding brackets 61 and 64 on the side of the body B, and the individual bolts 62 and 65 are fastened on the corresponding nuts 61a and 64a through the through holes 28a and 29a of the brackets 28 and 29. Thus, the airbag assembly SA can be fixed on the side of the body B.

By this time, the upper panel 10a, the lower panel 10b and so on have already been mounted on the vehicle.

Figure 23:
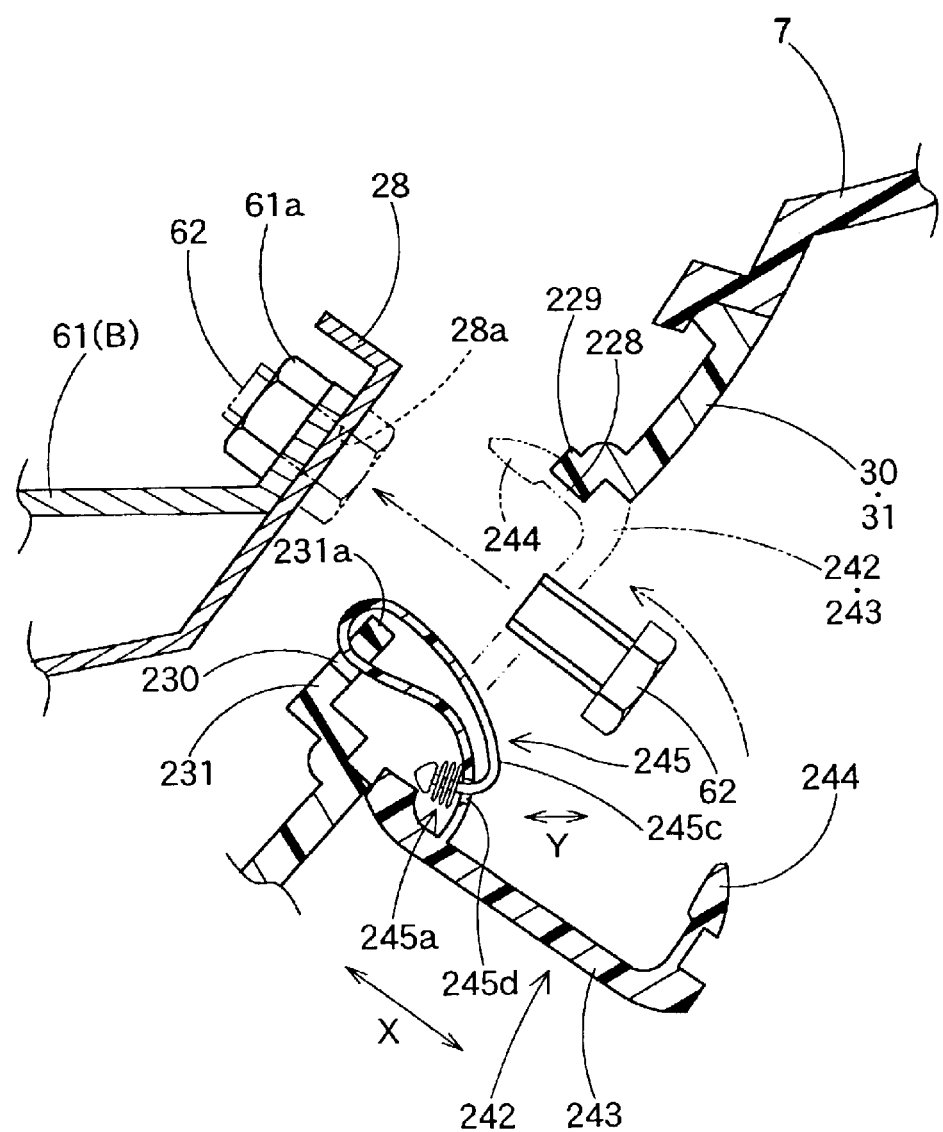
FIG. 23 is a diagram showing an airbag assembly of the fifth embodiment being fixed to the side of the body.

Moreover, the individual bolts 62 are inserted through the mounting holes 228 opened and fastened on the nuts 61a as shown in FIG. 23.

Thus, the mounting work of the airbag device S5 on the vehicle is completed by retaining the individual retaining pawls 244 on the peripheral edges of the corresponding mounting holes 228 to close the individual mounting holes 228 with the caps 242 after the individual bolts 62 and 65 were fastened, and by mounting the under cover 11 on the vehicle.

When an actuating signal is inputted to the body 48 of the inflator 47 through the lead wire 52 after the airbag device S5 was mounted on the vehicle, the inflating gas is discharged from the gas discharge ports 48c (not shown) of the inflator 47 so that it flows into the airbag 55 through the gas outlet port 49d of the diffuser 49. Accordingly, the airbag 55 is inflated to break the not-shown wrapping film and to push the door 44 of the airbag cover 30 thereby to break the breakage-expected portion 42, so that the door 44 is opened downward on the hinge portion 43. Then, the airbag 55 is expanded and inflated, as indicated by double-dotted lines in FIG. 20, to protrude toward the vehicular rear side from the opening 45 which is formed by the opened door 44, and to protrude largely upward along the column cover lower face 7a.

Figure 24:
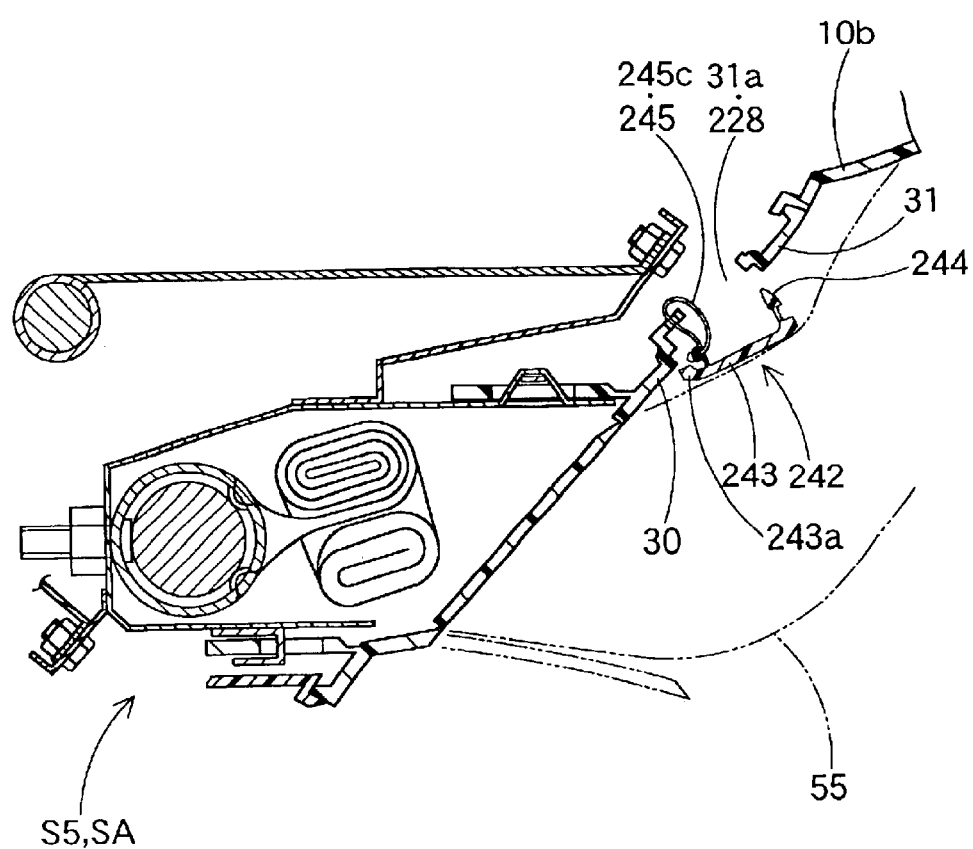
FIG. 24 is a diagram showing the cap of the fifth embodiment disengaging its retaining pawls from the mounting hole peripheral edge.

In the airbag device S5 of the fifth embodiment, moreover, the connection band 245 acting as a connection means is unremovably connected to the airbag cover 30. Even if the retaining pawls 244 are disengaged from the peripheral edge of the mounting hole 228 at the action time of the airbag device S5, as shown in FIG. 24, the cap 242 is, therefore, prevented from coming out of the airbag cover 30 by the connection band 245 acting as a connection means. As a result, the cap 242 is not blown off from the airbag cover 30.

When the mounting hole 228 is to be closed, the cap 242 is easily mounted on the airbag cover 30 merely by connecting the connection band 245 as the connection means to the ring portion 231 of the airbag cover 30 and by retaining the individual retaining pawls 244 on the peripheral edge of the mounting hole 228.

Especially, the cap 242 is mounted on the airbag cover 30 by using the connection band 245 as the connecting means and the retaining pawls 244. Specifically, it is not necessary to provide the whole peripheral edge of the cap 242 with the connection band 245 as a connection means. Instead, it is sufficient to provide the peripheral edge of the cap 244 partially with the connection means 245 and to provide at other portions with such one or more retaining pawl(s) 244 as can be mounted to close the mounting hole 228 with the cap 242. Moreover, the retaining pawls 244 can be retained on the peripheral edge of the mounting hole 228 merely by the works of pushing in the cap 242, so that the reduction in the mounting workability is minimized, as compared with the cap which is mounted only by the retaining pawls 244.

In the knee protecting airbag device S5 of the fifth embodiment, therefore, the cap 242 is prevented from being blown off at the action time of the device S5, even if the mounting hole 228 in the airbag cover 30 for fixing the airbag assembly SA on the body B is clogged with the easily mountable cap 242.

In the fifth embodiment, moreover, the connection band 245 acting as a connection means is inserted into the connection hole 230 arranged in the peripheral edge of the mounting hole 228, and is so fastened to the ring 231 while binding the ring 231 as not to come out of the connection hole 230. Therefore, the connecting work of the connection band 245 as the connection means in the cap 242 to the airbag cover 30 can be done by inserting the retaining head portion 245a of the connection band 245 formed integrally with the cap 242 into the connection hole 230 formed in the peripheral edges of the mounting hole 228 of the airbag cover 30, and by inserting the same into the retaining hole 245d on the connection band itself. Without using any other parts, therefore, the connection means 245 can be easily connected to the airbag cover 30.

Figure 25:
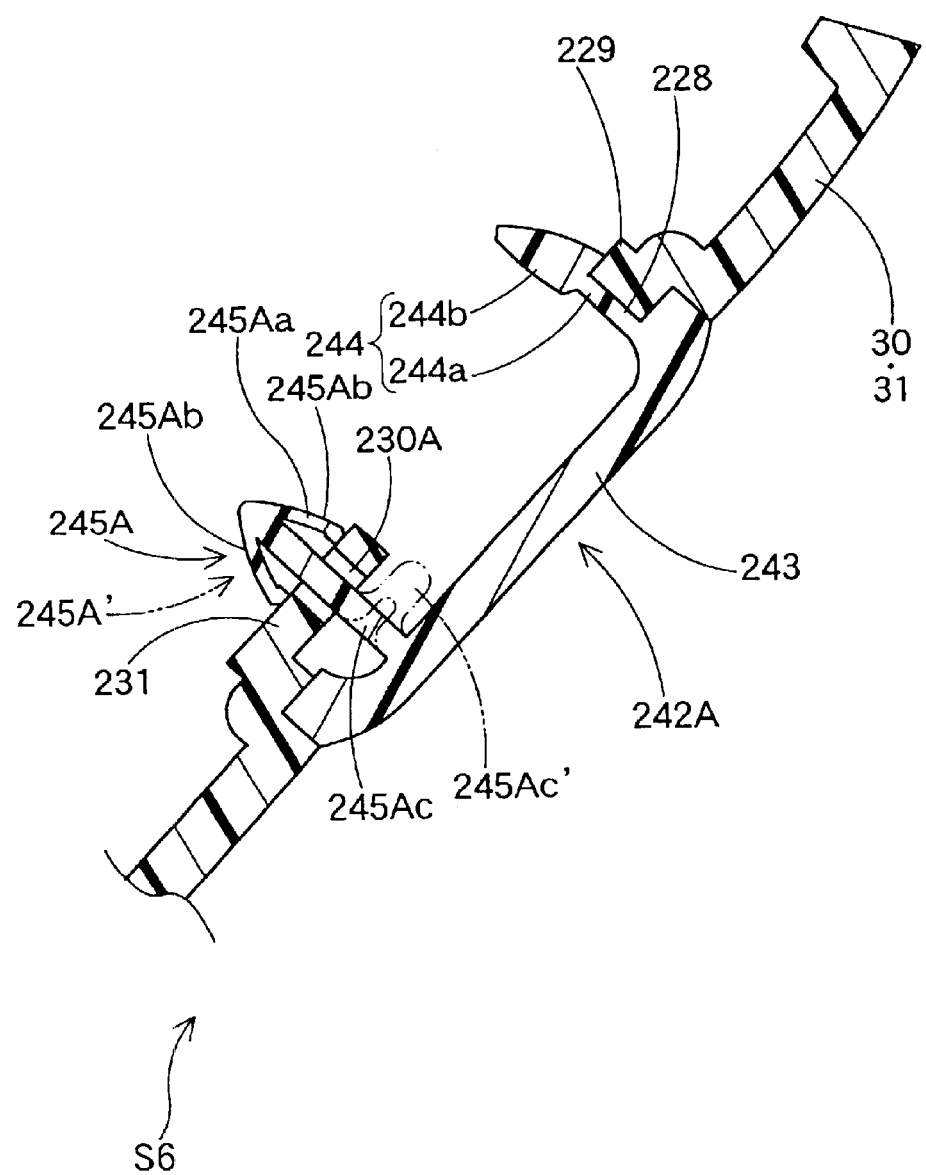
FIG. 25 is an enlarged section of the cap of the sixth embodiment.

Here in the fifth embodiment, the connection means for connecting the cap 242 to the airbag cover 30 is exemplified by the connection band 245 for binding the part 231a of the ring 231 with the stem portion 245c. As shown in FIG. 25, however, the construction may be modified to include a cap 242A of an airbag device S6 according to a sixth embodiment. The connection means for each cap 242A is a connection clip 245A, which is constructed by providing a stem portion 245Ac with a retaining head portion 245Aa at its leading end. The retaining head portion 245Aa is inserted into a connection hole 230A formed in the flange 229 of the peripheral edge of the mounting hole 228, and is so retained on the peripheral edge of the connection hole 230A as not to come out of the connection hole 230A. This connection clip 245A is molded like the connection band 245 integrally with the cover body 243 and the retaining pawls 244, and is arranged on the cap 242A. Here, this stem portion 245Ac has a rigidity. Like a connection clip 245A' indicated by double-dotted lines in FIG. 25, however, a stem portion 245Ac' may be elongated to have a flexibility. At the leading end of this stem portion 245Ac', there is arranged the retaining head portion 245Aa which is similar to the clip 245A. This retaining head portion 245Aa flexes elastically, when inserted into the connection hole 230A, like a spring to pass through the connection hole 230A, and is righted when it comes out of the connection hole 230A. The retaining head portion 245Aa is retained on the peripheral edge of the connection hole 230A unremovably by this restoration. In the case of the sixth embodiment, the retaining head portion 245Aa is constructed to include a plurality of flexible retaining members 245Ab.

In the fifth embodiment, moreover, even if the connection band 245 acting as a connection means of the cap 242 is connected to the airbag cover 30, the stem portion 245c of the connection band 245 slides through the connection hole 230 so that the cap 242 is movable relative to the airbag cover 30. Alternatively, the cap 242 can move relative to the airbag cover 30 so that the connection band 245 itself rocks on the part 245 binding the ring 231. After the connection band 245 was connected to the airbag cover 30, therefore, the retaining pawls 244 can be easily retained on the peripheral edge of the mounting hole 228 while moving the cap 242. With this construction, before the airbag assembly SA was mounted on the vehicle, the mounting hole 228 can be opened in advance while the connection band 245 being connected to the airbag cover 30, as shown in FIG. 23, by binding the part 231a of the ring 231. After the case 13 was fixed on the body B (or the brackets 61 and 64), moreover, the individual retaining pawls 244 can be instantly retained on the peripheral edge of the mounting hole 228 to close the mounting hole 228 merely by moving the cap 242. Therefore, the mounting hole 228 can be simply closed with the cap 242 without inviting the loss of the cap 242, after the case 13 was fixed on the body B. Here, these working-effects can also be likewise attained by the connection clip 245A', as indicated by the double-dotted lines in FIG. 25.

In the fifth embodiment, moreover, the retaining head portion 245a of the connection band 245 as the connection means is inserted at first into the connection hole 230 and further into the retaining hole 245d on the root side of the stem portion 245c while binding the part 245 of the ring 231 with the flexible stem portion 245c, and is then retained on the peripheral edge of the retaining hole 245d. Thus, the connection band 245 as the connection means can be mounted on the airbag cover 30. This mounting work can be done from the outer side of the general portion 31 so that the connecting work of the connection band 245 is facilitated. Moreover, the connection band 245 is attached to the airbag cover 30 while binding the peripheral edge 231a of the connection hole 230. Therefore, as compared with the case in which the retaining head portion 245Aa of the connection clips 245A and 245A' as a connection means is inserted into and directly retained on the peripheral edge of the connection hole 230A, as shown in FIG. 25, the force to remove the cap 242 hardly acts in the direction for the retaining head portion 245a to come out of the retaining hole 245d. More specifically, compared with the direction X for the cap 242 to come out of the mounting hole 228, the retaining head 245a comes out of the retaining hole 245d in the direction Y, as shown in FIG. 23. Therefore, even if the retaining pawls 244 are disengaged from the peripheral edge of the mounting hole 228, the cap 242 is hardly removed from the ring 230 so that it can be firmly mounted on the airbag cover 30.

In the fifth embodiment, still moreover, the cap 242 is arranged at the position to be covered with the airbag 55 having completed its expansion and inflation, and the connection band 245 as the connection means is arranged at the side of the door 44 of the airbag cover 30, on the peripheral edge of the cover body 243 of the cap 242. Therefore, even if the retaining pawls 244 are disengaged from the peripheral edge of the mounting hole 228 to leave the general portion 31 of the airbag cover 30 largely, as shown in FIG. 24, the portion 243a of the cover body 243 on the side of the door 44 is prevented by the connection band 245 from leaving the general portion 31 of the airbag cover 30 largely. While the airbag 55 is being expanded and inflated, more specifically, the retaining pawls 244 of the cap 242 are hidden in the cover body 243 of the cap 242 so that the airbag 55 being expanded and inflated can complete its inflation smoothly without any hindrance by the retaining pawls 245.

Here, the fifth and sixth embodiments have been described on the airbag devices S5 and S6 which are arranged on the vehicular front side of the driver MD so as to protect the knees K thereof. However, the airbag device of the aforementioned construction may also be arranged at such a position on the vehicular front side of a passenger seated on the front passenger's seat so as to protect the knees thereof.

What is claimed is:

1. A knee protecting airbag device to be arranged in front of the knees of a seated occupant, comprising:

a knee protecting airbag folded;

an inflator for feeding said airbag with an inflating gas;

a case for housing said airbag and said inflator, said case being opened at the vehicular rear side and mounted and fixed on the body side of the vehicle; and an airbag cover adapted to be assembled with said case and including: a door covering the opening of said case and openable when said airbag is expanded and inflated; and a general portion arranged around said door and surrounded by an interior member of the vehicle when mounted on the vehicle, wherein:

said knee protecting airbag device is constructed such that an airbag assembly is formed by assembling said airbag, said inflator and said airbag cover with said case and mounted on the vehicle; and said airbag cover is assembled so movably with said case as to absorb an assembling error between itself and said interior member arranged therearound;

wherein:

said case includes: a peripheral wall portion opened at the rear end side while enclosing said airbag and said inflator housed therein; and assembling members arranged on the outer surface of said peripheral wall portion and capable of being assembled with said airbag cover;

said airbag cover includes:

assembling pieces protruding toward the vehicular front side from said general portion and to be arranged adjacent to the portions of the peripheral wall portion of the case, at which said assembling members are arranged; and an assembling hole bored through said assembling piece at the position corresponding to said assembling member; and said assembling member includes:

a retaining frame inserted into said assembling hole for retaining said assembling piece; and a come-out stopper so arranged at the end of said retaining frame as to protrude from said assembling hole to the outer surface side of said assembling piece, and capable of retaining the peripheral edge of said assembling hole formed on the outer surface side of said assembling piece;

said assembling members are individually arranged on the opposed wall portions in said case peripheral wall portion; and the come-out stopper of said assembling member arranged on at least one wall portion includes:

a bent portion so arranged bent at the end of said retaining frame as to protrude from said assembling hole to the outer surface side of said assembling piece, and formed integrally with said retaining frame; and a locking bar made separate from said bent portion and so arranged and fixed between said bent portion and said assembling piece as to prevent said bent portion from coming out of said assembling hole.

2. A knee protecting airbag device according to claim 1, wherein:

said door includes:

a hinge portion on which said door to open arranged at a part of the peripheral edge thereof; and a breakage-expected portion to be broken when pushed by said airbag arranged in the portion of the peripheral edge except said hinge portion; and said assembling member for said locking bar to be provided on is arranged in the peripheral wall portion of said case positioned at the leading end side of said door apart from said hinge portion.

3. A knee protecting airbag device to be arranged in front of the knees of a seated occupant, comprising:

a knee protecting airbag folded;

an inflator for feeding said airbag with an inflating gas;

a case for housing said airbag and said inflator, said case being opened at the vehicular rear side and mounted and fixed on the body side of the vehicle; and an airbag cover adapted to be assembled with said case and including: a door covering the opening of said case and openable when said airbag is expanded and inflated; and a general portion arranged around said door and surrounded by an interior member of the vehicle when mounted on the vehicle, wherein:

said knee protecting airbag device is constructed such that an airbag assembly is formed by assembling said airbag, said inflator and said airbag cover with said case and mounted on the vehicle; and said airbag cover is assembled so movably with said case as to absorb an assembling error between itself and said interior member arranged therearound;

wherein:

said case includes: a peripheral wall portion opened at the rear end side while enclosing said airbag and said inflator housed therein; and assembling members arranged on the outer surface of said peripheral wall portion and capable of being assembled with said airbag cover;

said airbag cover includes:

assembling pieces protruding toward the vehicular front side from said general portion and to be arranged adjacent to the portions of the peripheral wall portion of the case, at which said assembling members are arranged; and an assembling hole bored through said assembling piece at the position corresponding to said assembling member; and said assembling member includes:

a retaining frame inserted into said assembling hole for retaining said assembling piece; and a come-out stopper so arranged at the end of said retaining frame as to protrude from said assembling hole to the outer surface side of said assembling piece, and capable of retaining the peripheral edge of said assembling hole formed on the outer surface side of said assembling piece;

said assembling members are individually arranged on the opposed wall portions in said case peripheral wall portion;

said assembling member arranged on at least one wall portion includes:

a fixing portion arranged on the end side in said come-out stopper apart from said retaining frame and capable of being fixed on said case peripheral wall portion; and a bent portion arranged at the end of said retaining frame on the side of said case peripheral wall portion and so formed and bent from said retaining frame as to be retained on said assembling hole peripheral edge; and said assembling piece is assembled with said assembling member by inserting said retaining frame into said assembling hole and by retaining said bent portion on said assembling hole peripheral edge to fix said fixing portion on said case peripheral wall portion.

4. A knee protecting airbag device according to claim 3, wherein:

said door includes: a hinge portion on which said door to open at a part of the peripheral edge thereof; and a breakage-expected portion to be broken by the push of said airbag at the portion of the peripheral edge except said hinge portion; and said assembling member for said bent portion to be provided on is arranged in said case peripheral wall portion positioned at the leading end side of said door apart from said hinge portion.

5. A knee protecting airbag device comprising:

a folded airbag;

a case for housing said airbag; and airbag cover for covering the vehicular rear side of said airbag housed, wherein:

said airbag is constructed to be so expanded and inflated that it may push and open said airbag cover, when an inflating gas is fed to the inside of said airbag, to protrude toward the vehicular rear side from an opening of said case on the vehicular rear side, so as to protect the knees of an occupant;

said airbag cover includes an upward openable door adapted to be so opened by turning the lower end side upward as to form an opening for protruding said airbag;

the lefthand and righthand side edges of said upward openable door are so arranged that one may be arranged closer to said occupant in the longitudinal direction of the vehicle whereas the other away from said occupant; and said upward openable door is so constructed:

that one of the lefthand and righthand side edges closer to said occupant has a shorter length whereas the other of the lefthand and righthand side edges apart from said occupant has a longer length; and that the leading end of said door opened and arranged generally in the horizontal direction may extend in the transverse direction of the vehicle.

6. A knee protecting airbag device according to claim 5, wherein:

a downward openable door to be opened by turning its upper end side downward is arranged below said upward openable door with its upper end adjoining the lower end of said upward openable door;

a breakage-expected portion to be broken by the push of said airbag being expanded and inflated, so as to open said upward and downward openable doors is arranged generally in an H-shape, as viewed from the vehicular rear side, around said upward and downward openable doors;

the lefthand and righthand vertical line portions of said H-shaped breakage-expected portion oppose each other transversely; and the transverse line portion of said H-shaped breakage-expected portion is vertically inclined with respect to the transverse direction of the vehicle.

7. A knee protecting airbag device according to claim 5, wherein:

a downward openable door to be opened by turning its upper end side downward is arranged below said upward openable door with its upper end adjoining the lower end of said upward openable door;

a breakage-expected portion to be broken by the push of said airbag being expanded and inflated, so as to open said upward and downward openable doors is arranged generally in an H-shape, as viewed from the vehicular rear side, around said upward and downward openable doors;

the lefthand and righthand vertical line portions of said H-shaped breakage-expected portion oppose each other transversely;

the transverse line of said H-shaped breakage-expected portion is arranged generally in the horizontal direction; and said upward openable door and said downward openable door are generally symmetric with respect to said transverse line portion.

* * * * *